US00RE49049E

(19) United States
(12) Reissued Patent
Zheng

(10) Patent Number: US RE49,049 E
(45) Date of Reissued Patent: Apr. 19, 2022

(54) SERVICE PROCESSING METHOD, DEVICE AND SYSTEM

(71) Applicant: Huawei Technologies Co., Ltd., Guangdong (CN)

(72) Inventor: Ruobin Zheng, Shenzhen (CN)

(73) Assignee: Huawei Technologies Co., Ltd., Shezhen (CN)

(21) Appl. No.: 16/540,082

(22) Filed: Aug. 14, 2019

Related U.S. Patent Documents

Reissue of:
(64) Patent No.: 9,736,062
Issued: Aug. 15, 2017
Appl. No.: 14/574,506
Filed: Dec. 18, 2014

U.S. Applications:
(63) Continuation of application No. PCT/CN2013/077371, filed on Jun. 18, 2013.

(30) Foreign Application Priority Data

Jun. 18, 2012 (CN) ..... 20120200555.1

(51) Int. Cl.
*H04L 12/58* (2006.01)
*H04L 45/00* (2022.01)
(Continued)

(52) U.S. Cl.
CPC ..... *H04L 45/54* (2013.01); *H04L 45/30* (2013.01); *H04L 45/50* (2013.01)

(58) Field of Classification Search
CPC ..... H04L 45/54; H04L 45/30; H04L 67/16
See application file for complete search history.

(56) References Cited

U.S. PATENT DOCUMENTS 8,711,838 B1 * 4/2014 Guichard ..... H04L 12/4645 370/351
2007/0286090 A1 * 12/2007 Rusmisel ..... H04L 45/502 370/252

(Continued)

FOREIGN PATENT DOCUMENTS

CN 101399774 4/2009
CN 101399774 A 4/2009

(Continued)

OTHER PUBLICATIONS

Chinese Office Action dated Feb. 3, 2016 in corresponding Chinese Patent Application No. 201210200555.1.

(Continued)

*Primary Examiner* — Luke S Wassum

(57) ABSTRACT

The present invention provides a service processing method, device and system. The method includes: receiving a service packet, and searching, according to a service identity in the service packet, a service routing table corresponding to the service packet, where the service identity represents a service to be processed [by the service packet]; and the service routing table includes *the service identity,* a service label used to represent a service feature in the service, and a routing path for processing the service feature; and setting the service label in the service packet according to the service routing table, and sending, according to the routing path, the service packet to a service processing device configured to process the service feature corresponding to the service label, so that the service processing device processes the service feature corresponding to the service label. The present invention reduces an impact on an original service and improves scalability.

10 Claims, 14 Drawing Sheets

(51) Int. Cl.
*H04L 45/30* (2022.01)
*H04L 45/50* (2022.01)

(56) References Cited

U.S. PATENT DOCUMENTS

2008/0165779 A1* 7/2008 Weiss ..... H04L 69/161 370/392
2008/0177896 A1* 7/2008 Quinn ..... H04L 67/2814 709/238
2008/0262990 A1* 10/2008 Kapoor ..... G06F 9/505 706/20
2008/0317054 A1* 12/2008 Yin ..... H04L 47/15 370/401
2009/0037713 A1* 2/2009 Khalid ..... H04L 12/4633 713/1
2009/0168779 A1 7/2009 Nguyen
2010/0043068 A1* 2/2010 Varadhan ..... H04L 12/4633 726/15
2010/0080226 A1* 4/2010 Khalid ..... H04L 41/5003 370/392
2010/0157963 A1 6/2010 Choi et al.
2010/0165985 A1 7/2010 Sharma et al.
2011/0158237 A1 6/2011 Mcdysan et al. ..... H04L 67/16 370/392
2012/0163381 A1* 6/2012 Lam ..... H04L 45/50 370/392
2013/0279508 A1* 10/2013 Kano ..... H04L 45/742 370/392
2013/0301412 A1* 11/2013 Weiss ..... H04L 47/2441 370/232
2013/0336315 A1* 12/2013 Guichard ..... H04L 45/50 370/389
2015/0163331 A1* 6/2015 Ni ..... H04L 69/22 709/224
2016/0112313 A1* 4/2016 Niu ..... H04L 69/22 370/392

FOREIGN PATENT DOCUMENTS

CN 101674221 3/2010
CN 101674221 A 3/2010
CN 102404695 4/2012
CN 102404695 A 4/2012
EP 2852109 A1 * 3/2015 ..... H04L 12/70
WO WO-2008152642 A1 * 12/2008 ..... G02F 7/00
WO WO-2010028545 A1 * 3/2010 ..... H04L 45/42
WO WO-2010045878 A1 * 4/2010 ..... H04L 12/56

OTHER PUBLICATIONS

PCT International Search Report dated Sep. 26, 2013 in corresponding International Patent Application No. PCT/CN2013/077371.
Extended European Search Report dated Mar. 11, 2015 in corresponding European Patent Application No. 13807508.0.
International Search mailed Sep. 26, 2013, in corresponding International Patent Application No. PCT/CN2013/077371.

* cited by examiner

SERVICE PROCESSING METHOD, DEVICE AND SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is *a Reissue Application of U.S. Pat. No. 9,736,062 B2, which is* a continuation of International Application No. PCT/CN2013/077371, filed on Jun. 18, 2013[, which]. *The International Application* claims priority to Chinese Patent Application No. 201210200555.1, filed on Jun. 18, 2012[, both of which]. *All of the aforementioned patent application and patents* are hereby incorporated by reference in their entireties.

TECHNICAL FIELD

The present invention relates to communications technologies, and in particular, to a service processing method, device and system.

BACKGROUND

An access network is used to connect a customer premises network (Customer Premises Network, CPN for short) and a backbone network. The access network may include access nodes such as a digital subscriber line access multiplexer (DSL Access Multiplexer, DSLAM for short) and a broadband remote access server (Broadband Remote Access Server, BRAS for short), or the BRAS may also be replaced with a broadband network gateway (Broadband Network Gateway, BNG for short).

Using a BRAS as an example, the BRAS may be configured to perform service processing on a received packet, where the service processing includes, for example, Internet video processing, deep packet inspection (Deep Packet Inspection, DPI for short), firewall and antivirus. With the development of the Internet, types of value-added services gradually increase, and correspondingly, the BRAS also needs to gradually enhance processing capabilities for various value-added services. In addition, each time a service upgrade is performed on the BRAS, that is, a service processing capability of the BRAS is enhanced, the BRAS needs to be powered off, and then service processing software or hardware of the BRAS is upgraded. However, the BRAS device generally supports tens of thousands to hundreds of thousands of users, and device power-off during a service upgrade interrupts an existing service, which greatly affects the users. Therefore, the prior art has poor scalability during service upgrade.

SUMMARY

The present invention provides a service processing method, device and system, so as to reduce an impact on an existing service during a service upgrade, and improve scalability during the service upgrade.

A first aspect of the present invention provides a service processing method, including:

receiving a service packet, and searching, according to a service identity in the service packet, a service routing table corresponding to the service packet, where the service identity represents a service to be processed [by the service packet]; and the service routing table includes a service label used to represent a service feature in the service, and a routing path for processing the service feature; and setting the service label in the service packet according to the service routing table, and sending, according to the routing path, the service packet to a service processing device configured to process the service feature corresponding to the service label, so that the service processing device processes the service feature corresponding to the service label.

Another aspect of the present invention provides a service processing control device, including:

a receiver, configured to receive a service packet;

a searching unit, configured to search, according to a service identity in the service packet received by the receiver, a service routing table corresponding to the service packet, wherein the service identity represents a service to be processed [by the service packet]; and the service routing table comprises a service label used to represent a service feature in the service, and a routing path for processing the service feature;

a processing unit, configured to set the service label in the service packet according to the service routing table; and a transmitter, configured to send, according to the routing path in the service routing table, the service packet set by the processing unit to a service processing device configured to process the service feature corresponding to the service label, so that the service processing device processes the service feature corresponding to the service label.

Still another aspect of the present invention provides a service processing device, including:

a receiver, configured to receive a service packet, wherein a service label is set in the service packet; and a service processing unit, configured to resolve the service label, and process a service feature corresponding to the service label.

Yet another aspect of the present invention provides a service processing system, including: the service processing control device according to the present invention, and the service processing device according to the present invention.

Technical effects of the service processing method, device and system of the present invention are: A service processing device processes a corresponding service feature according to a service label, so that during a service upgrade, it is only required to add a service processing device that supports a new service feature, which causes no impact on working of another service processing device. Therefore, compared with the prior art in which software and hardware of a service processing device are upgraded in a power-off manner, not only is an impact on an existing service reduced and scalability improved, but also implementation is simpler and quicker.

DESCRIPTION OF EMBODIMENTS

Embodiment 1

Figure 1:
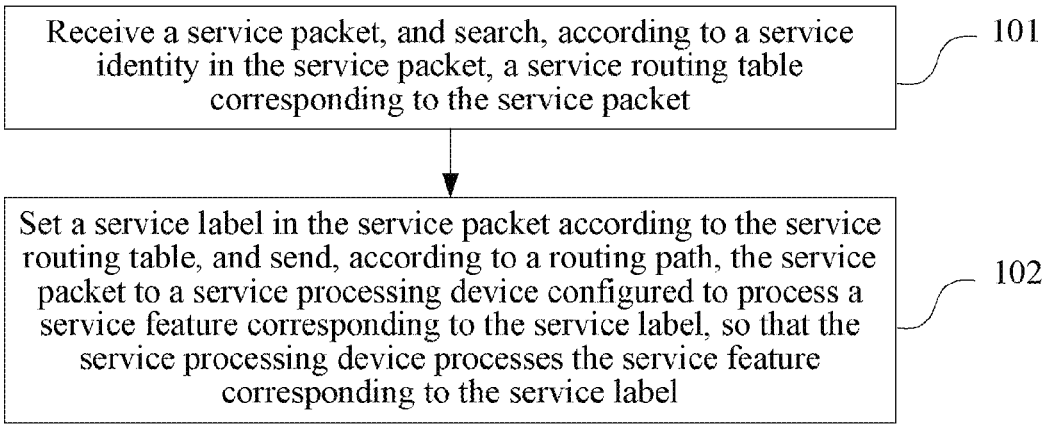
FIG. 1 is a schematic flowchart of an embodiment of a service processing method according to the present invention.

FIG. 1 is a schematic flowchart of an embodiment of a service processing method according to the present invention. The service processing method may be executed by a service processing system, where the service processing system includes multiple service processing units configured to process different service features separately. For example, the service processing system includes two service processing units, of which one is configured to process a service feature A, and the other is configured to process a service feature B. Certainly, each service processing unit may also have a capability of processing multiple service features, for example, processing service features B and C. In this embodiment, each service processing unit has a fixed service processing capability, that is, processes a service feature fixedly. The service processing unit is disposed on a service processing device, which means that a service processing device also processes a service feature fixedly. When a service feature needs to be added to a service processing system, it is only required to add a service processing device, and a service processing unit configured to process the service feature is disposed on the service processing device. Therefore, in the following method embodiments, the name of the service processing device is used for description.

As shown in FIG. 1, the service processing method of this embodiment includes:

101: Receive a service packet, and search, according to a service identity in the service packet, a service routing table corresponding to the service packet.

The service identity represents a service to be processed [by the service packet], and the service identity is, for example, a multi-tuple or a flow label, where the multi-tuple is, for example, a quintuple: a destination MAC address, a source MAC address, a destination IP address, a source IP address, and a TCP/UDP port number. According to the foregoing service identity, a service to be processed [by the service packet] may be known (generally a correspondence between a service identity and a service is preset, for example, if the quintuple is corresponding to a service Q, that is, as long as the quintuple is viewed, the service Q can be obtained).

The service routing table may include, for example, a service label used to represent a service feature in a service, and a routing path for processing a service feature. For example, an Internet service includes two service features, where the two service features may be virus filtering and video decoding. The service label herein is an identity obtained according to a preset encoding rule and used to represent the service feature. For example, the service feature "virus filtering" is represented by a service label A, and the service feature "video decoding" is represented by a service label B. A setting rule of the service label is not limited in the embodiment of the present invention, for example, a correspondence between a service label and a service feature may be determined by using a mapping relationship, an algorithm inference relationship, or the like, as long as the service feature can be identified by setting the service label.

The routing path for processing the service feature refers to, for example, that the service feature "virus filtering" represented by the service label A needs to be processed, and the service routing table may record an egress port and an ingress port of the service packet when the service feature is processed, so that the service packet may arrive, according to a routing path specified by the egress port and the ingress port, at a service processing device configured to process the service feature.

For the searching, according to a service identity, a service routing table corresponding to the service packet, an example is provided as follows: A service routing table may record a service label, a routing path and the like that are corresponding to a service identity S1, and further record a service label, a routing path and the like that are corresponding to a service identity S2. When receiving a service packet, the service processing system may find, in the service routing table according to the service identity S1 carried in the packet, a service label and a routing path that are corresponding to the packet, instead of using the service label and the routing path that are corresponding to the service identity S2. For the purpose of brief and convenient description, in the embodiment of the present invention, a service label, a routing path and the like that are corresponding to a service identity are referred to as a service routing table corresponding to the service identity.

102: Set a service label in the service packet according to the service routing table, and send, according to a routing path, the service packet to a service processing device configured to process a service feature corresponding to the service label, so that the service processing device processes the service feature corresponding to the service label.

In this embodiment, because the service processing system includes multiple service processing devices, the service processing system sends the service packet to the multiple service processing devices according to the routing path set in the service routing table, so that each service processing device separately processes each service feature in the packet, thereby jointly completing processing on the service packet.

A routing path for a service feature to be processed is found from the service routing table. For example, if a service packet needs to be sent from an egress port a of a device in the service processing system to an ingress port b of a service processing device, the service packet can arrive at the service processing device as if the service packet is sent according to a path from the egress port a to the ingress port b. In addition, a service label of a service feature to be processed is set in the service packet. In this way, the service processing device can process a corresponding service feature according to the service label.

Herein, the sending the service packet to a service processing device according to the service routing table, so that the service processing device processes a service feature corresponding to the service label, includes a centralized routing solution and a distributed routing solution. The specific centralized routing solution and distributed routing solution are described in detail in the subsequent embodiments, and are simply described herein. For example, a service processing control device in the service processing system uniformly controls setting of a service label of a service packet and forwarding of a service packet, so that a service packet can be processed in the multiple service processing devices successively; alternatively, each service processing device in the service processing system may also be responsible for setting of a service label and forwarding of a service packet, so that a service packet is processed in the multiple service processing devices successively.

Processing the service packet in the service processing devices in the service processing system may cause multiple processing results. For example, after the processing on the service packet ends, the service packet is sent from an egress port of the service processing system, or, after the processing ends, the service packet is directly discarded. These processing results are all recorded in the service routing table, and the service processing system can perform corresponding processing according to the service routing table.

In the service processing method of this embodiment, a service packet is processed by a service processing system, where the service processing system includes multiple service processing devices configured to process specific service features separately, and the multiple service processing devices process various service features in the service packet separately, thereby jointly completing the processing on the service packet. In this way, when a service upgrade is performed, if, for example, processing on a service feature Y needs to be added, it is only required to add a service processing device configured to process the service feature Y to the service processing system, the newly-added service processing device is connected to the service processing system, and a service routing table of the service processing system is updated, so that the service packet can arrive at the newly-added service processing device for processing. The service upgrade implementation solution is simple and quick, and is easy to implement, and causes no impact on working of an existing service processing device in the system, thereby improving scalability during service upgrade, and improving efficiency in service upgrade and extension.

The service processing method of the present invention is described in detail by using several specific application scenarios as examples separately in the following Embodiment 2 to Embodiment 5. It should be noted that, in all the several embodiments, that a service processing system is a network including multiple devices is used as an example, and in specific implementation, for example, connection manners of the devices in the network are not limited, as long as mutual communication can be performed. For example, the devices in the network may also be function modules integrated in a physical device, and the service processing system is a network formed by connecting the function modules inside the physical device by using a connection cable or a connector.

Embodiment 2

Figure 2:
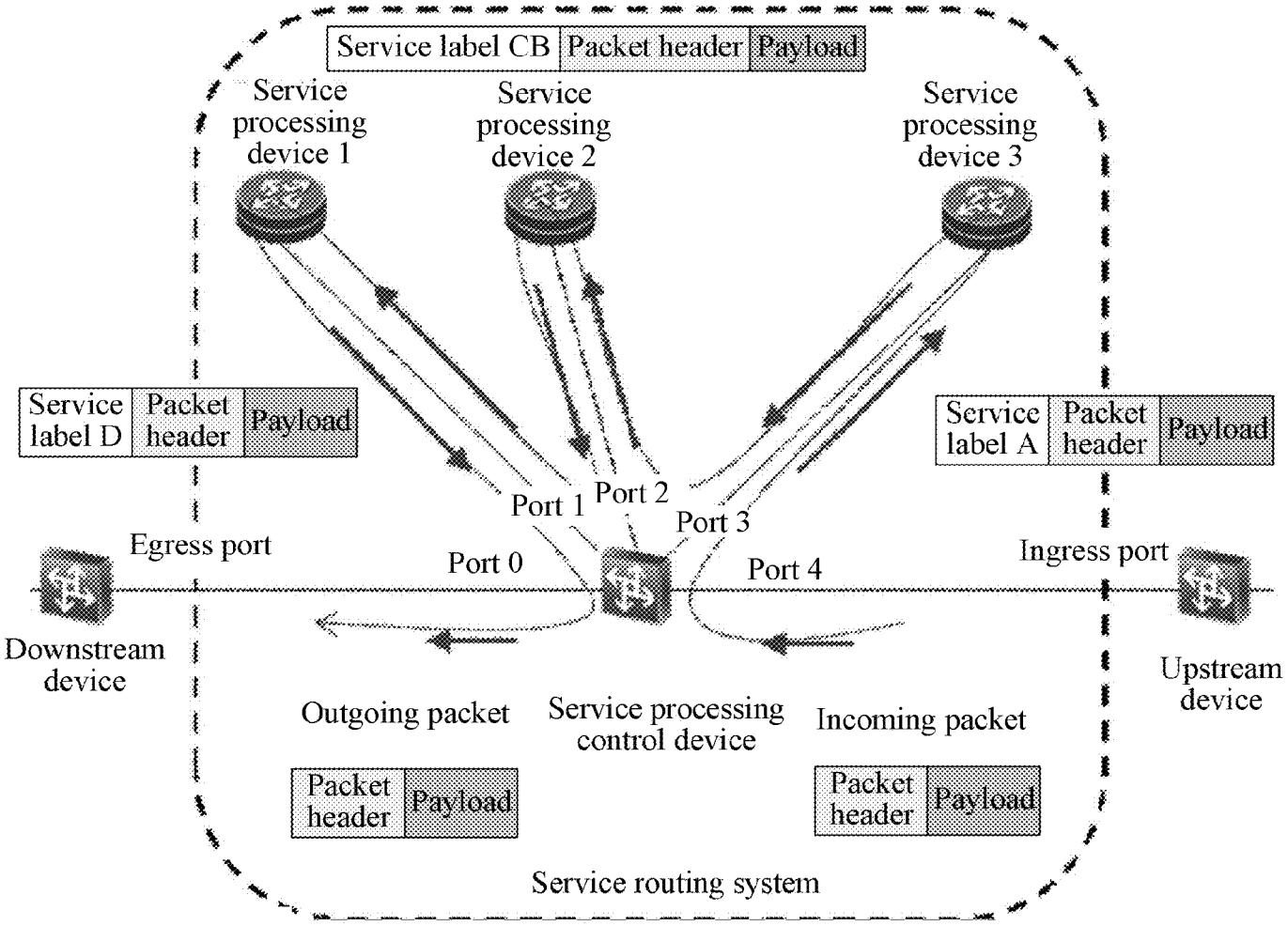
FIG. 2 is an architectural diagram of an application system of another embodiment of a service processing method according to the present invention.
Figure 3:
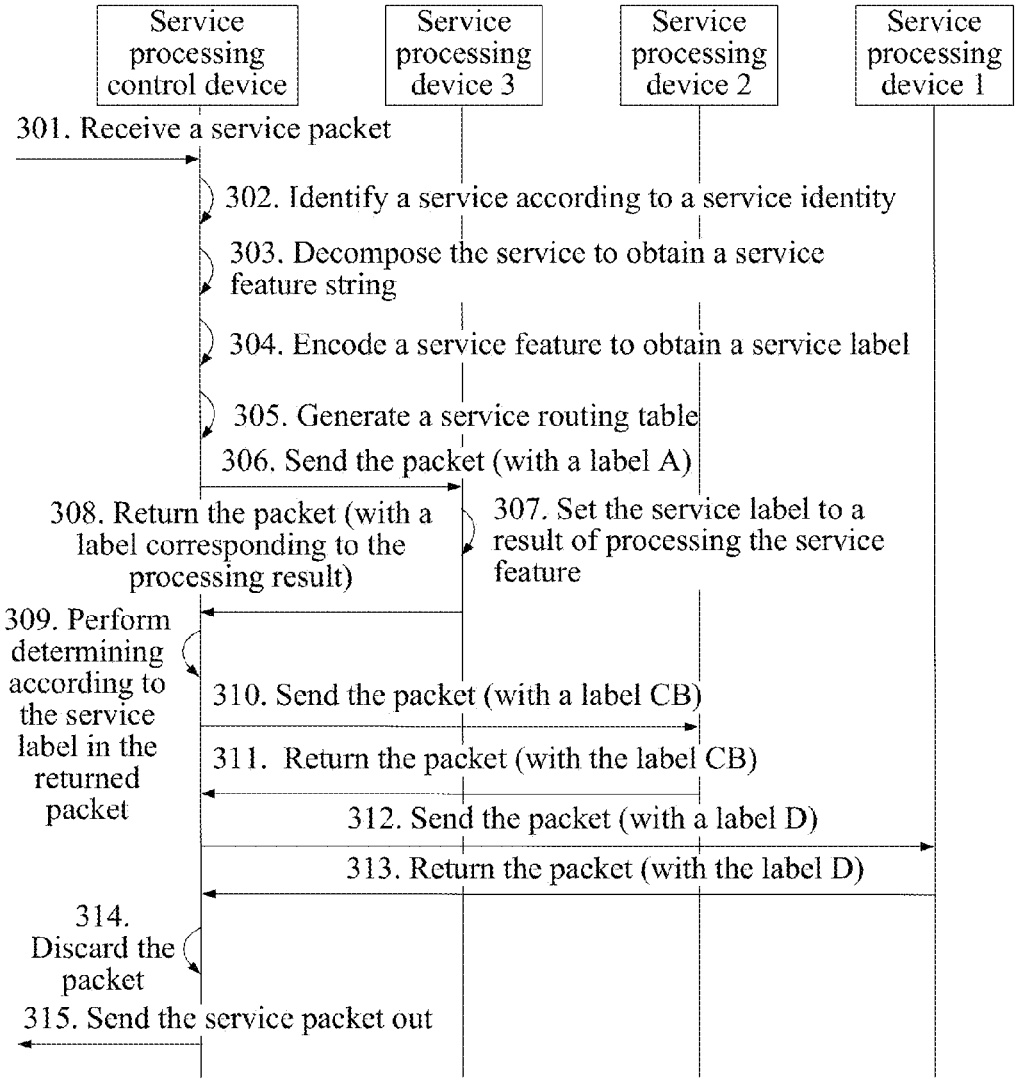
FIG. 3 is a schematic signaling diagram of another embodiment of a service processing method according to the present invention.

FIG. 2 is an architectural diagram of an application system of another embodiment of a service processing method according to the present invention, and FIG. 3 is a schematic signaling diagram of another embodiment of a service processing method according to the present invention. In this embodiment, a centralized routing solution is used as an example for description. In addition, a service routing table is generated when a service packet is received, and routing processing in a next step is determined according to a service label in the service routing table.

As shown in FIG. 2, a service processing system in this embodiment includes a service processing control device and multiple service processing devices, for example, includes one service processing control device, and a service processing device 1, a service processing device 2 and a service processing device 3. A service processing unit is disposed in each service processing device, where the service processing unit is a functional unit configured to process a service feature.

In the service processing system in this embodiment, a simple star connection is used between the service processing control device and the multiple service processing devices, where the service processing control device is connected to the multiple service processing devices separately, and the service processing devices are not interconnected to each other. The service processing control device includes a port 0, a port 1, a port 2, a port 3 and a port 4, where the port 1, the port 2 and the port 3 are separately connected to the service processing devices according to the manner shown in FIG. 2.

The service processing system is externally presented as a whole, and an external device can obtain only the port 0, an address of the port 0, the port 4, and an address of the port 4 from the service processing system, that is, the whole service processing system communicates with the external device by using the port 0 and the port 4. In this embodiment, that the port 4 receives a service packet (referred to as an incoming packet) from an upstream device, and the port 0 sends a service packet (referred to as an outgoing packet) to a downstream device is used as an example. Certainly, in specific implementation, in the service processing system, the service processing control device and the multiple service processing devices may also be presented as a network element each, instead of being presented as a whole as shown in FIG. 2.

As shown in FIG. 2 and FIG. 3, a direction of arrows in FIG. 2 represents a packet path of a service packet in the service processing system according to the service processing method of this embodiment, where the service processing method includes:

301: The service processing control device receives a service packet.

The service processing control device may receive the service packet from the upstream device through the port 4. In this embodiment, the upstream device or the downstream device shown in FIG. 2 is not limited to a specific device, and may be determined according to a requirement of specific implementation.

The service packet generally includes a packet header and a payload, where the payload refers to a data packet on which encapsulation and transmission are performed, and the packet header bears related information of the packet, for example, a packet type and a packet version.

302: The service processing control device acquires a service identity in the service packet, and obtains, according to the service identity, a service to be processed [by the service packet].

The service packet generally includes a service identity, where the service identity refers to, for example, a multi-tuple (such as a quintuple) or a flow label, where the quintuple includes: a destination MAC address, a source MAC address, a destination IP address, a source IP address, and a TCP/UDP port number. The service processing device may identify, according to the service identity, the service to be processed [by the service packet].

In this embodiment, that the service packet includes a flow label used to identify a service type of the service packet is used as an example, where the flow label may be set at a Multi-Protocol Label Switching (Multi-Protocol Label Switching, MPLS for short) layer, a Media Access Control (Media Access Control, MAC for short) layer or an IP layer of the service packet. The flow label may be set in the packet header, or set in the packet header and a part of the payload.

303: The service processing control device decomposes a service to obtain a service feature string corresponding to the service.

The service feature string includes: each service feature in the service and a processing sequence of each service feature; and further, may also include a possible result of processing the service feature, and an impact of a result of processing the service feature on the processing sequence of the service feature.

For example, after the service is decomposed, the following information may be obtained: It is assumed that a service to be processed [by the service packet] includes a service feature A, a service feature B, a service feature C and a service feature D. First, the service feature A is processed, where different processing results may exist after the service feature A is processed, and it is assumed that three results, 1, 2 or 3, of processing the service feature A exist. If the result of processing the service feature A is 1, the service feature C continues to be processed, and finally the service feature B is processed; if the result of processing the service feature A is 2, the service feature D continues to be processed; and if the result of processing the service feature A is 3, the service processing ends.

304: The service processing control device encodes a service feature to obtain a service label used to represent the service feature.

A service feature encoding rule or a service feature encoding table may be preset on the service processing control device. Herein, the service feature is encoded according to the preset service feature encoding rule or service feature encoding table, to generate a service label corresponding to the service feature.

For example, it is assumed that the service feature A is "virus filtering", and the service feature B is "video decoding"; in this case, "virus filtering" and "video decoding" are service features, and A and B are service labels obtained after the service features are encoded according to the service feature encoding rule or the service feature encoding table. It should be noted that, for the purpose of convenient description, in the embodiment of the present invention, a service feature is directly and briefly referred to as a service label of the service feature, for example, the service feature "virus filtering" is directly referred to as a "service feature A" subsequently, where A is actually the service label of "virus filtering".

305: The service processing control device obtains, according to the service feature string, and service features that are separately supported by multiple service processing devices, a routing path for the service features; and generates a service routing table according to the service identity, the service label, and the routing path.

Referring to the following Table 1, Table 1 is an optional centralized service routing table:

TABLE 1

Centralized service routing table

| Ingress port | Flow label | Service feature processing sequence number | Incoming service label | Egress port | Next-hop service label |
|---|---|---|---|---|---|
| 4 | 1 | 1 | Label-free | 3 | A |
| 3 | | 2 | 1 | 2 | CB |
| | | | 2 | 1 | D |
| | | | 3 | None | Label-free |
| 2 | | 3 | CB | 0 | Label-free |
| 1 | | 4 | D | 0 | Label-free |

According to the service feature string obtained in 303, for example, "if the result of processing the service feature A is 1, the service feature C continues to be processed, and finally the service feature B is processed; if the result of processing the service feature A is 2, the service feature D continues to be processed . . . ", and it is assumed that in this embodiment, the service processing device 1 is configured to process the service feature D, the service processing device 2 is configured to process the service features B and C, and the service processing device 3 is configured to process the service feature A. In addition, the service processing control device is connected to the service processing device 1 through the port 1, connected to the service processing device 2 through the port 2, and connected to the service processing device 3 through the port 3.

According to the foregoing service feature string, the service feature supported by each service processing device, and a connection relationship between the service processing control device and each service processing device, a routing path for the service feature may be obtained. The routing path herein refers to, for example, as shown in Table 1, what may be obtained from Table 1: "a service packet is received from an ingress port 3 (that is, a packet with the service feature A processed by the service processing device 3), and an incoming service label of the service packet is 2 (that is, the result of processing the service feature A is 2), and therefore the service label is modified to D (that is, it may be learned according to the service feature string that the service feature D continues to be processed), and the service packet is sent from an egress port 1 (it may be learned according to the service feature supported by each service processing device that the service processing device 1 supports the service feature D, and the service processing control device is connected to the service processing device 1 through the port 1)".

In this embodiment, a service routing table may be generated according to the foregoing obtained routing path, flow label (that is, the service identity in the service packet) and service label (for example, the service labels A and B). As shown in Table 1, Table 1 shows a routing path (including, for example, an ingress port and an egress port), a flow label, and a service label (including, for example, an incoming service label and a next-hop service label), which jointly form the service routing table. The incoming service label refers to a label included in a service packet received by a service processing device, and because the service packet arrives at the service processing device and is received by the service processing device, the label is referred to as an "incoming service label". Correspondingly, a service label sent from the service processing device may be referred to as an "outgoing service label". The next-hop service label refers to a service label corresponding to next-step processing performed after the service processing device completes processing. For example, if the service processing device completes processing on a service feature, and a service feature that needs to continue to be processed in a next step is "video decoding", a next-hop service label is the service label B corresponding to "video decoding".

In addition, because the service processing control device processes service features in a packet successively in a centralized manner, the service processing control device needs to control a processing sequence of the service features, where the processing sequence also needs to be embodied in the service routing table. In this embodiment, as shown in Table 1, next-step processing is determined by relying on an "incoming service label", for example, when the incoming service label is 1, a corresponding next-hop service label is CB, that is, the next step is processing the service features C and B; and when the incoming service label is 2, a corresponding next-hop service label is D, that is, the next step is processing the service feature D. In addition, incoming service labels of the "incoming service label" column in Table 1 are different from each other, and accordingly the service processing control device may determine a processing sequence of each service feature and corresponding next-step processing (details of a specific determining manner are provided in the subsequent steps of this embodiment). Therefore, a service feature processing sequence number in Table 1 is optional in this embodiment, that is, the service feature processing sequence number in Table 1 may be removed.

Optionally, the service routing table may also be manually generated and configured onto the service processing control device.

306: The service processing control device obtains, according to the service identity in the service packet, a service routing table corresponding to the service packet, and sets a service label A in the service packet according to the service routing table; and sends, according to the routing path, the service packet to the service processing device 3 configured to process a service feature A.

After the service routing table is generated in 305, the service processing control device searches, according to the flow label in the service packet, the service routing table corresponding to the packet, where the service routing table includes each service feature corresponding to the packet, the routing path for the service feature, and the like.

As shown in Table 1, the service processing control device searches the service routing table according to the received service packet. Because in this case, the service packet has no service label, that is, an incoming service label is label-free, a corresponding egress port (which is 3 in Table 1) and a next-hop service label (which is A in Table 1) when the incoming service label is label-free can be obtained according to the service routing table.

The service processing control device adds the next-hop service label, that is, A, to the service packet, and then sends the service packet to the service processing device 3 by using the port 3 of the service processing control device. The service label may be set at an MPLS layer, a MAC layer, or an IP layer of the service packet.

307: The service processing device 3 processes a service feature corresponding to the service label, and modifies the service label according to a result of processing the service feature.

After receiving the packet, the service processing device 3 processes a corresponding service feature according to the service label in the packet, for example, if the service label set in the packet is A, where A represents the service feature "virus filtering", the service processing device 3 performs service feature "virus filtering" processing on the packet according to the service label A in the packet. It should be noted that, a service feature encoding rule or a service feature encoding table may be preset on all devices, including the service processing control device and the service processing devices, in the service processing system, where the service feature encoding rule or the service feature encoding table is set on the service processing control device to set a service label in a packet, so as to instruct a service processing device to process a corresponding service feature, and the service feature encoding table is set on a service processing device to enable the service processing device to identify, according to the service feature encoding table when the service processing device receives a service packet that carries a service label, which service feature the service label represents, thereby perform processing on a corresponding service feature.

It is assumed that there may be three processing results for the processed service feature A, that is, results of processing the service feature A may be 1, 2 or 3. In this embodiment, the service processing device 3 modifies the service label in the received service packet (that is, the service label A inserted in 306) to a result of processing the service feature A.

For example, if the result of processing the service feature A is 1, the service processing device 3 modifies the original service label A in the service packet to 1; if the result of processing the service feature A is 2, the service processing device 3 modifies the original service label A in the service packet to 2; and if the result of processing the service feature A is 3, the service processing device 3 modifies the original service label A in the service packet to 3.

308: The service processing device 3 returns the service packet to the service processing control device.

309: The service processing control device determines next-step processing on the service packet according to the service packet returned by the service processing device 3 and the service routing table.

The service processing control device receives the service packet returned by the service processing device 3, and searches the service routing table, that is, Table 1, according to the service label in the packet (corresponding to an "incoming service label" in the service routing table, that is, the service label in the received packet), to obtain an egress port corresponding to a next step and a next-hop service label for the service packet, and performs corresponding processing.

In this embodiment, because the service processing device 3 obtains three results of processing the service feature A, and the service processing device 3 directly modifies the service label to a processing result, determining next-step processing according to an "incoming service label" of the service routing table actually is equivalent to determining next-step processing according to a result of processing the service feature.

For example, as shown in Table 1, when the service label in the packet is 1, a corresponding incoming service label in the service routing table is 1, the service routing table is searched to obtain that a corresponding egress port is 2 and a corresponding next-hop service label is CB, and 310 and 311 continue to be performed; when the service label in the packet is 2, a corresponding incoming service label in the service routing table is 2, the service routing table is searched to obtain that a corresponding egress port is 1 and a corresponding next-hop service label is D, and 312 and 313 continue to be performed; and when the service label in the packet is 3, a corresponding incoming service label in the service routing table is 3, the service routing table is searched to obtain that a corresponding egress port is none and a corresponding next-hop service label is label-free, and 314 continues to be performed.

310: The service processing control device modifies the service label in the packet to CB, that is, the service processing control device sets, in the service packet, a service label corresponding to a service feature that is to be processed in a next step, and then forwards the packet by using the port 2 of the service processing control device, and sends the packet to the service processing device 2.

311: The service processing device 2 receives the service packet, first processes a service feature C and then processes a service feature B according to the service label CB in the packet, and then returns the packet to the service processing control device, where the service label is unchanged; and the procedure jumps to 315.

312: The service processing control device modifies the service label in the packet to D, that is, the service processing control device sets, in the service packet, a service label corresponding to a service feature that is to be processed in a next step; and then forwards the packet by using the port 1 of the service processing control device, and sends the packet to the service processing device 1.

313: The service processing device 1 receives the service packet, processes a service feature D according to the service label D in the packet, and then returns the packet to the service processing control device, where the service label is unchanged; and the procedure jumps to 315.

314: The service processing control device no longer forwards the packet, but directly discards the service packet, and the service processing procedure ends.

315: The service processing control device receives the service packet, and searches the service routing table according to the service label, and if determining that the packet has no remaining service feature to be processed, deletes the service label, and forwards the service packet by using an egress port.

The service label in the service packet that is returned by the service processing device 2 and received by the service processing control device in 311 is CB, and the received service label in the service packet that is returned by the service processing device 1 in 313 is D, that is, by searching a row corresponding to the incoming service label CB or D in the service routing table, that is, Table 1, it may be obtained that when the incoming service label is CB or D, the egress port of the service packet in the next step is the port 0, and the next-hop service label is label-free. That is, in this case, the service packet has no remaining service feature to be processed, and processing on all service features to be processed in the packet is completed, so that the service processing control device deletes the service label in the packet, and then sends the packet by using the port 0, thereby completing a series of service feature processing needed by the packet.

In the service processing method of this embodiment, a service processing control device sets service labels in a centralized manner so that a service packet is forwarded between service processing devices, the packet is sent to and from the service processing control device multiple times, and the service processing devices jointly complete processing on service features in the packet. An advantage of the centralized routing solution is that: a service processing device neither needs to store a service routing table nor needs to perform service routing processing, the function is simple, the service processing devices do not need to be interconnected to each other, and a simple star connection may be used between the service processing control device and the service processing devices, so that connection relationships between devices in a service processing system are simple, and implementation is convenient. In addition, in this embodiment, corresponding next-step processing can be performed according to a result of processing a service feature, thereby flexibly implementing service processing.

Embodiment 3

Figure 4:
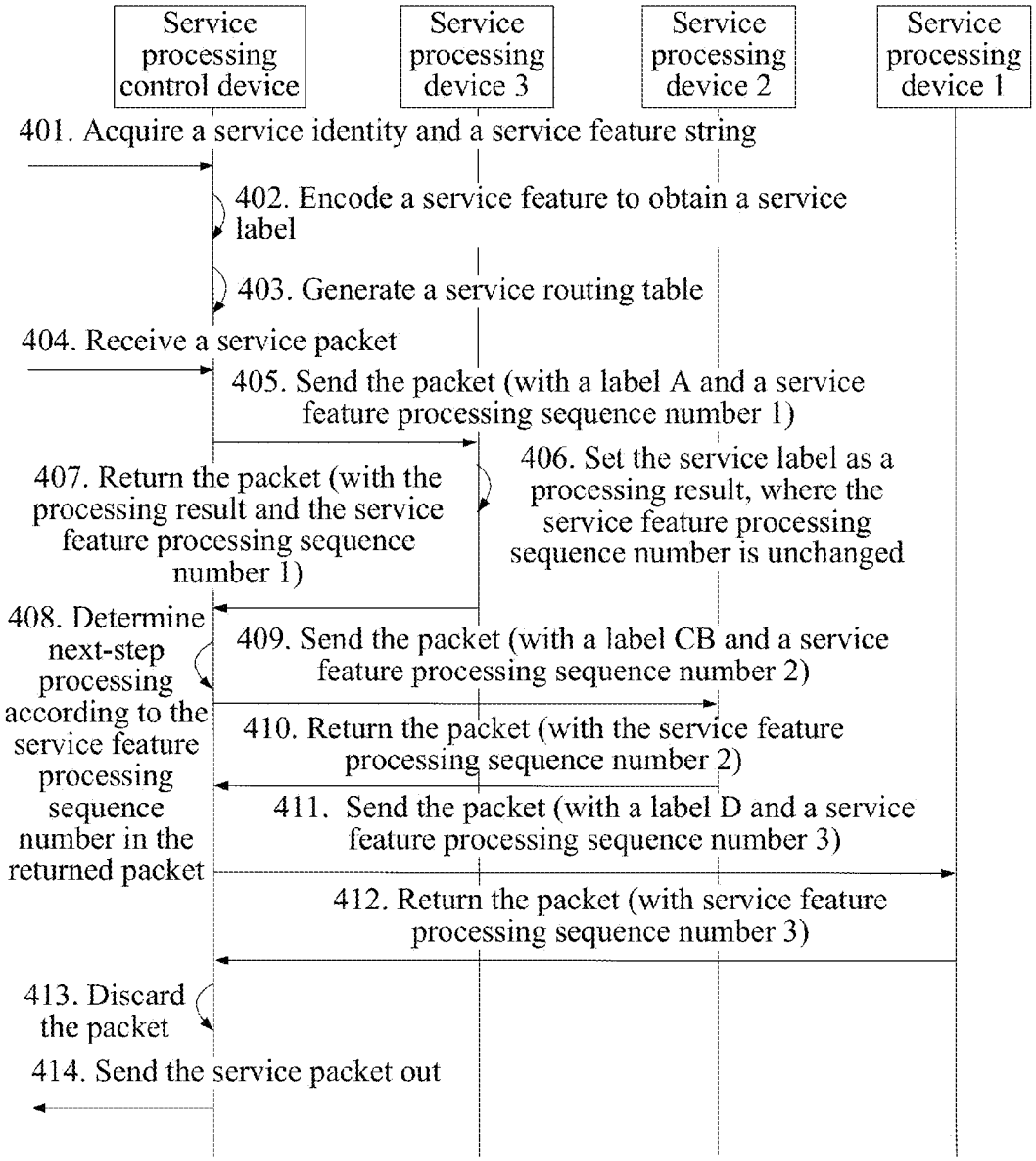
FIG. 4 is a schematic signaling diagram of still another embodiment of a service processing method according to the present invention.

FIG. 4 is a schematic signaling diagram of still another embodiment of a service processing method according to the present invention. An architecture of an application system of the service processing method in this embodiment is the same as that in FIG. 2, and this embodiment still uses a centralized routing solution. A difference from Embodiment 2 lies in: A service routing table of this embodiment is generated before a service processing control device receives a service packet, and routing processing in a next step is determined according to a service feature processing sequence number in the service routing table. Therefore, both a service label and a service feature processing sequence number are added to the service packet.

As shown in FIG. 2 and FIG. 4, the service processing method of this embodiment includes:

401: A service processing control device acquires, from outside of a service processing system, a service identity of a service packet, and a service feature string corresponding to a service represented by the service identity.

The service feature string includes: each service feature in the service and a processing sequence of each service feature. For specific description of the service feature string, reference may be made to Embodiment 2, and details are not described again. In this embodiment, that the service identity is a flow label is still used as an example, and the flow label and the service feature string are not obtained by analyzing the service packet by the service processing control device as described in Embodiment 2, but are acquired from outside of the service processing system.

For example, in an authentication, authorization and accounting (Authentication, Authorization and Accounting, AAA for short) server or a policy server, service serving information corresponding to a user is pre-configured, where the service serving information includes a flow label and a service feature string corresponding to the flow label, where the service feature string may include each service feature, a possible result of processing the service feature, processing sequence of the service feature, and an impact of a result of processing the service feature on the service feature sequence. After the user is authenticated successfully, the service processing control device may acquire the service serving information from the AAA server or the policy server.

402: The service processing control device encodes a service feature to obtain a service label used to represent the service feature.

A service feature encoding rule or a service feature encoding table may be preset on the service processing control device. Herein, the service feature is encoded according to the preset service feature encoding rule or service feature encoding table, to generate a service label corresponding to the service feature.

For example, it is assumed that a service feature A is "virus filtering", and a service feature B is "video decoding"; in this case, "virus filtering" and "video decoding" are service features, and A and B are service labels obtained after the service features are encoded according to the service feature encoding rule or the service feature encoding table.

403: The service processing control device obtains, according to the service feature string, and service features that are supported by multiple service processing devices separately, a routing path for the service features; and generates a service routing table according to the service identity, the service label, and the routing path.

A method for generating a service routing table in this embodiment is similar to that in Embodiment 2, and details are not described again. Referring to the following Table 2, Table 2 is another optional centralized service routing table.

TABLE 2

Centralized service routing table

| Ingress port | Flow label | Service feature processing sequence number | Incoming service label | Egress port | Next-hop service label |
|---|---|---|---|---|---|
| 4 | 1 | None | None | 3 | A |
| 3 | | 1 | 1 | 2 | CB |
| | | | 2 | 1 | D |
| | | | 3 | None | Label-free |
| 2 | | 2 | None | 0 | Label-free |
| 1 | | 3 | None | 0 | Label-free |

As shown in Table 2, a difference between Table 2 and Table 1 lies in that: because in this embodiment, routing processing in a next step is determined according to a service feature processing sequence number, the column of the service feature processing sequence number must be set, instead of being optional as in Table 1. In addition, entries in the column of the incoming service label also do not need to be different from each other as those shown in Table 1 to perform different determining. For the incoming service label in this embodiment, it is set by default that after each service processing device processes a service feature corresponding to a service label of a received packet, if no processing result needs to be fed back, the service label is deleted. For example, an incoming service label corresponding to a service feature processing sequence number 2 in Table 2 is none, which indicates that a service processing device 2 deletes a service label after processing a service feature CB; and an incoming service label corresponding to a service feature processing sequence number 1 still is a result of processing a service feature A.

404: The service processing control device receives the service packet.

The service processing control device may receive the service packet from an upstream device through a port 4. In this embodiment, the upstream device or a downstream device shown in FIG. 2 is not limited to a specific device, and may be determined according to a requirement of specific implementation.

The service packet generally includes a packet header and a payload, where the payload refers to a data packet on which encapsulation and transmission are performed, and the packet header bears related information of the packet, for example, a packet type and a packet version.

405: The service processing control device searches, according to the flow label in the service packet, a service routing table corresponding to the service packet, sets a service label A in the service packet according to the service routing table, and further sets a service feature processing sequence number 1 in the packet; and sends, according to the routing path, the service packet to a service processing device 3 configured to process a service feature A.

The service processing control device searches, according to the flow label in the service packet, the service routing table corresponding to the packet, where the service routing table includes each service feature corresponding to the packet and the routing path.

As shown in Table 2, the service processing control device searches the service routing table according to the received service packet. Because in this case, the service packet has no service feature processing sequence number, when it is obtained by searching the service routing table that there is no service feature processing sequence number, a corresponding egress port is 3, and a next-hop service label is A.

The service processing control device adds the next-hop service label, that is, A, to the service packet, and also adds the service feature processing sequence number 1 (which is equivalent to a sequence number corresponding to a service feature to be processed in a next step after corresponding processing on the service label A is completed, so that it may be convenient to directly find next-step processing according to the sequence number when a returned packet is received) to the packet (the service feature processing sequence number is not shown in FIG. 2), and then the service packet is sent to the service processing device 3 by using a port 3 of the service processing control device. The service label A and the service feature processing sequence number 1 may be set at an MPLS layer, a MAC layer, or an IP layer of the service packet.

406: The service processing device 3 processes a service feature corresponding to the service label, and modifies the service label according to a result of processing the service feature, where the service feature processing sequence number is unchanged.

After receiving the packet, the service processing device 3 processes a corresponding service feature according to the service label in the packet, for example, if the service label set in the packet is A, where A represents the service feature "virus filtering", the service processing device 3 performs service feature "virus filtering" processing on the packet according to the service label A in the packet. It should be noted that, a service feature encoding rule or a service feature encoding table may be preset on all devices, including the service processing control device and the service processing devices, in the service processing system, where the service feature encoding rule or the service feature encoding table is set on the service processing control device to set a service label in a packet, so as to instruct a service processing device to process a corresponding service feature, and the service feature encoding table is set on a service processing device to enable the service processing device to identify, according to the service feature encoding table when the service processing device receives a service packet that carries a service label, which service feature the service label represents, thereby processing a corresponding service feature.

It is assumed that three processing results may occur on the processed service feature A, that is, results of processing the service feature A may be 1, 2 or 3. In this embodiment, the service processing device 3 sets the service label in the received service packet (that is, the service label A inserted in 405) to a result of processing the service feature A.

For example, if the result of processing the service feature A is 1, the service processing device 3 modifies the original service label A in the service packet to 1; if the result of processing the service feature A is 2, the service processing device 3 modifies the original service label A in the service packet to 2; and if the result of processing the service feature A is 3, the service processing device 3 modifies the original service label A in the service packet to 3.

407: The service processing device 3 returns the service packet to the service processing control device.

408: The service processing control device determines next-step processing on the service packet according to the service packet returned by the service processing device 3 and the service routing table.

The service processing control device receives the service packet returned by the service processing device 3, searches the service routing table according to the service feature processing sequence number and the service label in the packet, to obtain next-step processing corresponding to the service feature processing sequence number, that is, obtain a corresponding egress port corresponding to a next step and a next-hop service label for the service packet, and performs corresponding processing.

In this embodiment, because the service processing device 3 obtains three results of processing the service feature A, and the service processing device 3 directly modifies the service label to a processing result, actually, next-step processing is determined according to a service feature processing sequence number and a result of processing the service feature.

For example, as shown in Table 2, first a corresponding row in Table 2 is found according to the service feature processing sequence number 1 in the service packet; next, corresponding to the service feature processing sequence number 1, when the service label in the packet is 1, a corresponding incoming service label in the service routing table is 1, it is obtained that a corresponding egress port is 2 and a next-hop service label is CB, and 409 and 410 continue to be performed; when the service label in packet is 2, a corresponding incoming service label in the service routing table is 2, the service routing table is searched to obtain that a corresponding egress port is 1 and a next-hop service label is D, and 411 and 412 continue to be performed; and when the service label in the packet is 3, a corresponding incoming service label in the service routing table is 3, the service routing table is searched to obtain that a corresponding egress port is none and a next-hop service label is label-free, and 413 continues to be performed.

409: The service processing control device modifies the service label in the packet to CB, that is, the service processing control device sets, in the service packet, a service label corresponding to a service feature that is to be processed in a next step; and increases the service feature processing sequence number progressively (by 1 in this embodiment), that is, modifies the service feature processing sequence number to 2, and then forwards the packet by using the port 2 of the service processing control device, and sends the packet to the service processing device 2.

410: The service processing device 2 receives the service packet, first processes a service feature C and then processes a service feature B according to the service label CB in the packet; and if no result of processing the service feature B needs to be fed back, the service processing device 2 deletes the service label, where the service feature processing sequence number is unchanged, and then returns the packet to the service processing control device, and the procedure jumps to 414; and certainly, if the service processing device 2 has a processing result to be fed back, the service processing device 2 modifies the service label to a result of processing a service feature, in the same manner in which the service processing device 3 performs feedback according to the result of processing the service feature A.

411: The service processing control device modifies the service label in the packet to D, that is, the service processing control device sets, in the service packet, a service label corresponding to a service feature that is to be processed in a next step; and modifies the service feature processing sequence number to 3, then forwards the packet by using the port 1 of the service processing control device, and sends the packet to the service processing device 1.

412: The service processing device 1 receives the service packet, and processes the service feature D according to the service label D in the packet; and if no result of processing the service feature D needs to be fed back, the service processing device 1 deletes the service label, where the service feature processing sequence number is unchanged, and then returns the packet to the service processing control device, and the procedure jumps to 414.

413: The service processing control device no longer forwards the packet, but directly discards the service packet, and the service processing procedure ends.

414: The service processing control device receives the service packet, and searches the service routing table according to the service feature processing sequence number, and if determining that the packet has no remaining service feature to be processed, deletes the service feature processing sequence number, and forwards the service packet by using an egress port.

The service feature processing sequence number in the service packet that is returned the service processing device 2 and received by the service processing control device in 410 is 2, and the service feature processing sequence number in the service packet that is returned by the service processing device 1 and received by the service processing control device in 412 is 3, that is, by searching a row corresponding to the service feature processing sequence number 2 or 3 in the service routing table, that is, Table 2, it may be obtained that when the service feature processing sequence number is 2 or 3, the egress port of the service packet in the next step is the port 0, and the next-hop service label is label-free. That is, in this case, the service packet has no remaining service feature to be processed, and all service features to be processed in the packet have been processed, so that the service processing control device deletes the service feature processing sequence number in the packet, and then sends the packet by using the port 0, thereby completing a series of service feature processing needed by the packet.

In the service processing method of this embodiment, a service processing control device sets service labels in a centralized manner so that a service packet is forwarded between service processing devices, the packet is sent to and from the service processing control device multiple times, and the service processing devices jointly complete processing on service features in the packet. An advantage of the centralized routing solution is that: a service processing device neither needs to store a service routing table nor needs to perform service routing processing, the function is simple, the service processing devices do not need to be interconnected to each other, and a simple star connection may be used between the service processing control device and the service processing devices, so that connection relationships between devices in a service processing system are simple, and implementation is convenient. In addition, in this embodiment, corresponding next-step processing can be performed according to a result of processing a service feature, thereby flexibly implementing service processing.

Embodiment 4

Figure 5:
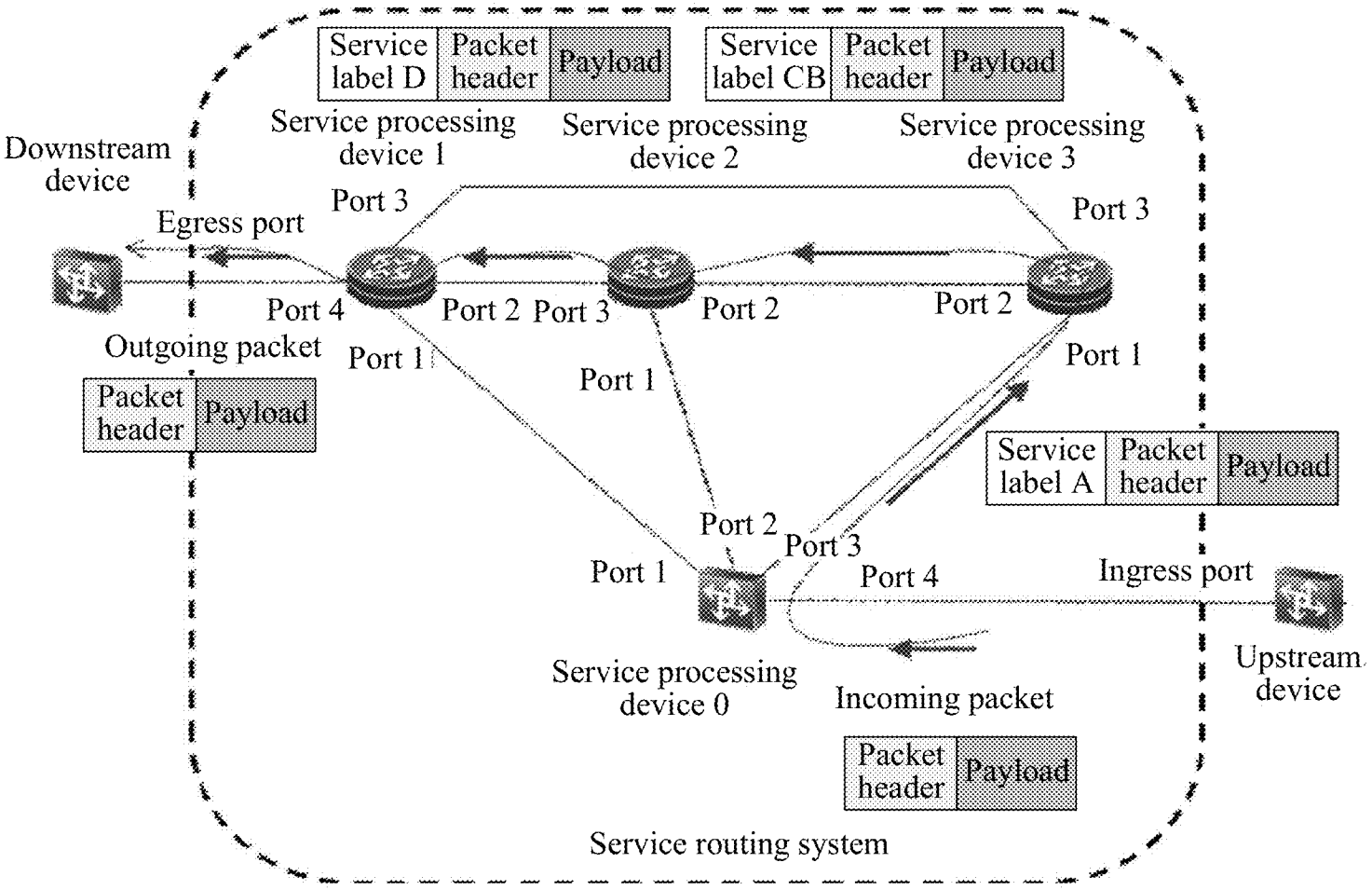
FIG. 5 is an architectural diagram of an application system of yet another embodiment of a service processing method according to the present invention.
Figure 6:
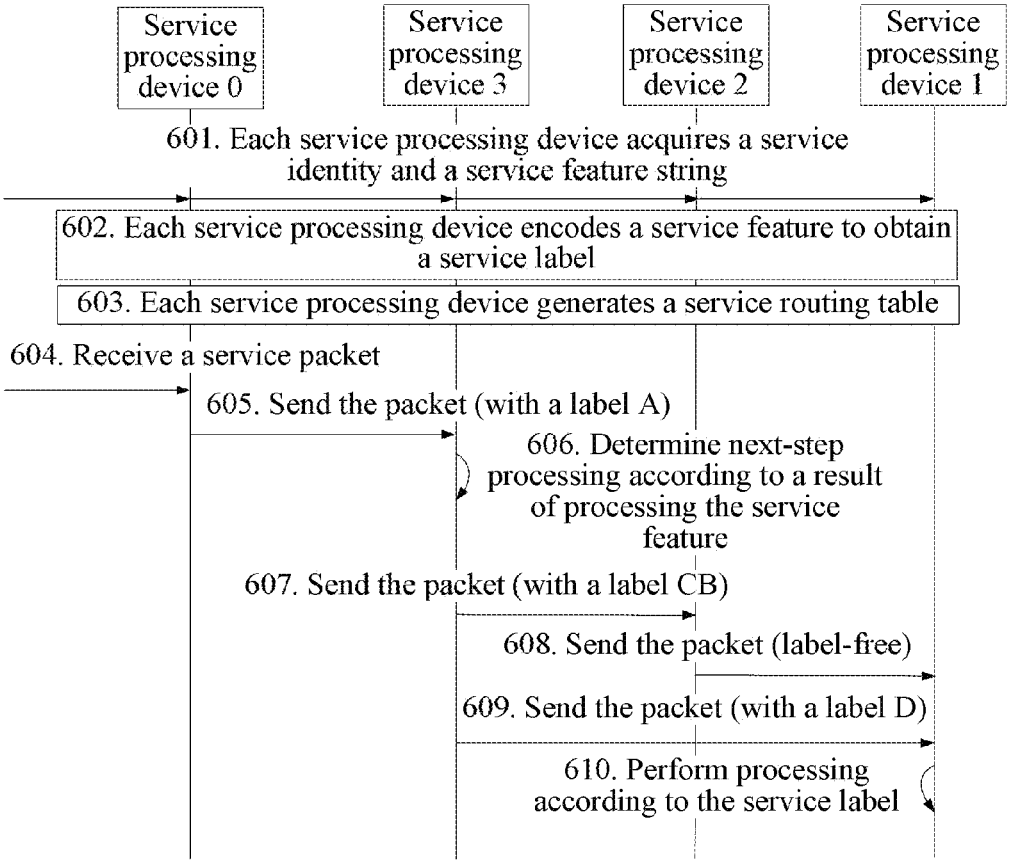
FIG. 6 is a schematic signaling diagram of yet another embodiment of a service processing method according to the present invention.

FIG. 5 is an architectural diagram of an application system of yet another embodiment of a service processing method according to the present invention, and FIG. 6 is a schematic signaling diagram of yet another embodiment of a service processing method according to the present invention. In this embodiment, a distributed routing solution is used as an example for description. In addition, a service routing table is generated before a service packet is received. A service processing system in this embodiment includes service processing devices, and the service processing devices integrate functions of the service processing control device and the service processing devices in FIG. 2, and a service packet enters one service processing device, and is sent out of another service processing device, instead of using the service processing control device as shown in FIG. 2 as egress and ingress ports of the packet.

As shown in FIG. 5, the service processing system in this embodiment includes a service processing device 0, a service processing device 1, a service processing device 2 and a service processing device 3. Each service processing device integrates functions of the service processing control device and the service processing device in FIG. 2, which can generate and maintain a service routing table, can set a service label in a service packet, and can also process a service feature; and each service processing unit is disposed in a service processing device.

In the service processing system in this embodiment, the service processing devices are interconnected to each other, for example, the service processing device 0 is connected to the service processing device 1 to the service processing device 3 separately, and the service processing device 1 is also connected to the service processing device 2 and the service processing device 3. For ports included in each service processing device, and which port is specifically used to interconnect the service processing devices, refer to FIG. 5, which are not described again. In this embodiment, that a service packet enters the service processing system from a port 4 of the service processing device 0, and is sent out of the service processing system from a port 4 of the service processing device 1 is used as an example, that is, service processing devices receive a packet and send the packet. A direction of arrows in FIG. 5 represents a packet path of a service packet in the service processing system according to the service processing method of this embodiment.

In this embodiment, it is still assumed that the service processing device 3 supports processing on a service feature A, the service processing device 2 supports processing on service features B and C, and the service processing device 1 supports processing on a service feature D. As shown in FIG. 5 and FIG. 6, the service processing method of this embodiment includes:

601: Each service processing device in the service processing system acquires, from outside of the service processing system, a service identity of a service packet, and a service feature string corresponding to a service represented by the service identity.

For specific description of the service feature string, reference may be made to Embodiment 2 and Embodiment 3, and details are not described again. In this embodiment, that the service identity is a flow label is still used as an example, and the flow label and the service feature string are acquired from outside of the service processing system.

In this embodiment, it is still assumed that the flow label and the service feature string are acquired from an AAA server or a policy server. After a user is authenticated successfully, each service processing device may acquire the foregoing information from the AAA server or the policy server, or the AAA server or the policy server distributes the foregoing information to each service processing device in the service processing system.

Each service processing device herein includes all the service processing devices in the service processing system, and certainly, according to a specific implementation situation, because the service processing device 0 processes no service feature in subsequent steps, each service processing device in this embodiment at least includes a service processing device 1, a service processing device 2 and a service processing device 3, all of which process the acquired information.

602: Each service processing device encodes a service feature to obtain a service label used to represent the service feature.

A service feature encoding rule or a service feature encoding table may be preset on each service processing device. Herein, the service feature is encoded according to the preset service feature encoding rule or the service feature encoding table, to generate a service label corresponding to the service feature.

For example, it is assumed that the service feature A is "virus filtering", and the service feature B is "video decoding"; in this case, "virus filtering" and "video decoding" are service features, and A and B are service labels obtained after the service features are encoded according to the service feature encoding rule or the service feature encoding table.

603: Each service processing device obtains, according to the service feature string, and service features that are supported by multiple service processing devices separately, a routing path for the service features; and generates a service routing table according to the service identity, the service label, and the routing path.

The method for generating a service routing table in this embodiment is similar to that in Embodiment 2 and Embodiment 3, and details are not described again. In a process of generating a service routing table in this embodiment, each service processing device generates a service routing table according to a service feature separately supported by each service processing device in the service processing system, and a port connection relationship between the service processing device and another service processing device. The service routing table only includes a routing path associated with a service feature processed by the service processing device and a connection port of the service processing device, which actually is equivalent to splitting a centralized service routing table in a centralized routing solution, where each service processing device stores a part of service routing table associated with each service processing device.

Referring to the following Table 3 to Table 6, Table 3 to Table 6 are separately service routing tables stored on the service processing devices in FIG. 5 separately.

TABLE 3

Service routing table of service processing device 0

| Ingress port | Flow label | Incoming service label | Result of processing incoming service feature | Egress port | Next-hop service label |
|---|---|---|---|---|---|
| 4 | 1 | Label-free | None | 3 | A |

TABLE 4

Service routing table of service processing device 3

| Ingress port | Flow label | Incoming service label | Result of processing incoming service feature | Egress port | Next-hop service label |
|---|---|---|---|---|---|
| 1 | 1 | A | 1 | 2 | CB |
| | | | 2 | 3 | D |
| | | | 3 | None | None |

TABLE 5

Service routing table of service processing device 2

| Ingress port | Flow label | Incoming service label | Result of processing incoming service feature | Egress port | Next-hop service label |
|---|---|---|---|---|---|
| 2 | 1 | CB | None | 3 | None |

TABLE 6

Service routing table of service processing device 1

| Ingress port | Flow label | Incoming service label | Result of processing incoming service feature | Egress port | Next-hop service label |
|---|---|---|---|---|---|
| 2 | 1 | None | None | 4 | None |
| 3 | 1 | D | None | 4 | None |

As shown in the foregoing Table 3 to Table 6, structures of the service routing tables are basically the same as those of entries in the centralized service routing table. It should be noted that, a service routing table in this embodiment includes an "incoming service label" and a "result of processing an incoming service feature"; and in subsequent steps, a service processing device obtains next-step processing on a packet by searching the routing table according to a service label. The "result of processing an incoming service feature" is mainly used by the service processing device to determine next-step processing by combining the service label and the result of processing the service feature, when several possible different processing results exist and each result is corresponding to different next-step processing.

604: The service processing device 0 receives the service packet.

The service processing device 0 may receive the service packet from an upstream device through the port 4; and the service packet generally includes a packet header and a payload, where the payload refers to a data packet on which encapsulation and transmission are performed, and the packet header bears related information of the packet, for example, a packet type and a packet version.

605: The service processing device 0 searches, according to the flow label in the service packet, a service routing table corresponding to the service packet, and sets a service label A in the service packet according to the service routing table; and sends, according to the routing path, the service packet to the service processing device 3 configured to process a service feature A.

The service processing device 0 searches, according to the flow label in the service packet, the service routing table corresponding to the packet. As shown in Table 3, the vice processing device 0 searches the service routing table according to the received service packet. Because in this case, the service packet has no service label, when the service routing table is searched to obtain that the service packet has no service label, a corresponding egress port is 3, and a next-hop service label is A.

The service processing device 0 adds the next-hop service label, that is, A, to the service packet, and then sends the service packet to the service processing device 3 by using a port 3. The service label A may be set at an MPLS layer, a MAC layer or an IP layer of the service packet.

It should be noted that, in a centralized routing solution, a packet received by a service processing control device has four service features, that is, service features A, B, C and D, to be processed, and the service processing control device needs to set, in a service routing table, a service feature execution sequence for the four service features, for example, the service feature A is processed this time, and the service feature C is processed next time. Certainly, the service feature execution sequence in the service routing table may be limited by an independently set "service feature processing sequence number", or the execution sequence may be determined according to an "incoming service label". Therefore, in a centralized routing solution, generally a manner for determining a service feature execution sequence is needed; however, in a distributed routing solution, a service packet received by each service processing device already includes labels of all service features to be processed by each service processing device. For example, if a packet received by the service processing device 3 carries a service label A, the service processing device 3 only needs to process a service feature corresponding to the service label A, and each service processing device does not involve the problem of determining a processing sequence for multiple service features in the centralized routing solution. Therefore, in the distributed routing solution of this embodiment, a service feature processing sequence number may not be necessarily set in a service routing table.

606: The service processing device 3 processes a service feature corresponding to the service label, and determines next-step processing according to a result of processing the service feature.

It is assumed that there are three processing results for the processed service feature A in this embodiment, that is, results of processing the service feature A may be 1, 2 or 3. In this embodiment, after completing processing on the service feature A, the service processing device 3 searches the service routing table (that is, Table 4) according to the service label A in the packet, where corresponding to the "incoming service label A", the "result of processing the incoming service feature" has three possible values, where the three possible values are the possible results of processing the service feature A; and the service processing device 3 determines next-step processing on the service packet according to a result of processing the service feature.

For example, if the result of processing the service feature A is 1, the service processing device 3 obtains by searching the table that a corresponding egress port is 2 and a next-hop service label is CB, and 607 and 608 continue to be performed; if the result of processing the service feature A is 2, the service processing device 3 obtains by searching the table that a corresponding egress port is 3 and a next-hop service label is D, and 609 and 610 continue to be performed; and if the result of processing the service feature A is 3, the service processing device 3 obtains by searching the table that a corresponding egress port is none and a next-hop service label is none, and the service processing device 3 no longer forwards the packet, for example, may discard the service packet directly.

607: The service processing device 3 modifies the service label in the packet to CB, that is, the service processing device 3 sets, in the service packet, a service label corresponding to a service feature that is to be processed in a next step, and then forwards the packet by using a port 2 of the service processing device 3, and sends the packet to the service processing device 2.

608: The service processing device 2 receives the service packet, and first processes the service feature C and then processes the service feature B according to the service label CB in the packet; and then obtains by searching Table 5 that a corresponding egress port is 3 and a next-hop service label is none, and therefore deletes the service label and sends the packet to the service processing device 1 through a port 3, and the procedure jumps to 610.

609: The service processing device 3 modifies the service label in the packet to D, that is, the service processing device 3 sets, in the service packet, a service label corresponding to a service feature that is to be processed in a next step, and then forwards the packet by using a port 3 of the service processing device 3, and sends the packet to the service processing device 1.

610: The service processing device 1 receives the service packet, and performs next-step processing on the service packet according to the service label in the packet.

In this embodiment, referring to Table 6, the service label in the service packet received by the service processing device 1 (that is, an incoming service label) may have two results, which may be label-free or the service label D.

For example, if the packet has no service label, the service processing device 1 may obtain by searching Table 6 that a corresponding egress port is 4 and a next-hop service label is none, which indicates that there is no remaining service feature to be processed, so that the service processing device 1 sends the service packet from a port 4 of the service processing device 1, and the processing procedure of the service packet ends.

For example, if the service label in the packet is D, the service processing device 1 may obtain by searching Table 6 that in this case, a corresponding egress port is 4 and a next-hop service label is none. Because there is no next-hop service label, the service label is deleted, and then the service packet is sent from the port 4 of the service processing device 1, and the processing procedure of the service packet ends.

In the service processing method of this embodiment, a distributed routing method is used, where service processing devices are interconnected to each other, and service routing is dispersed in the service processing devices for distributed processing. An advantage of the manner that: a shortest service routing path can be achieved, which avoids a path along which a packet is sent to and from a service processing control device multiple times during service routing in a centralized service routing solution. In addition, in this embodiment, corresponding next-step processing can also be performed according to a result of processing a service feature, thereby flexibly implementing service processing.

Embodiment 5

Figure 7:
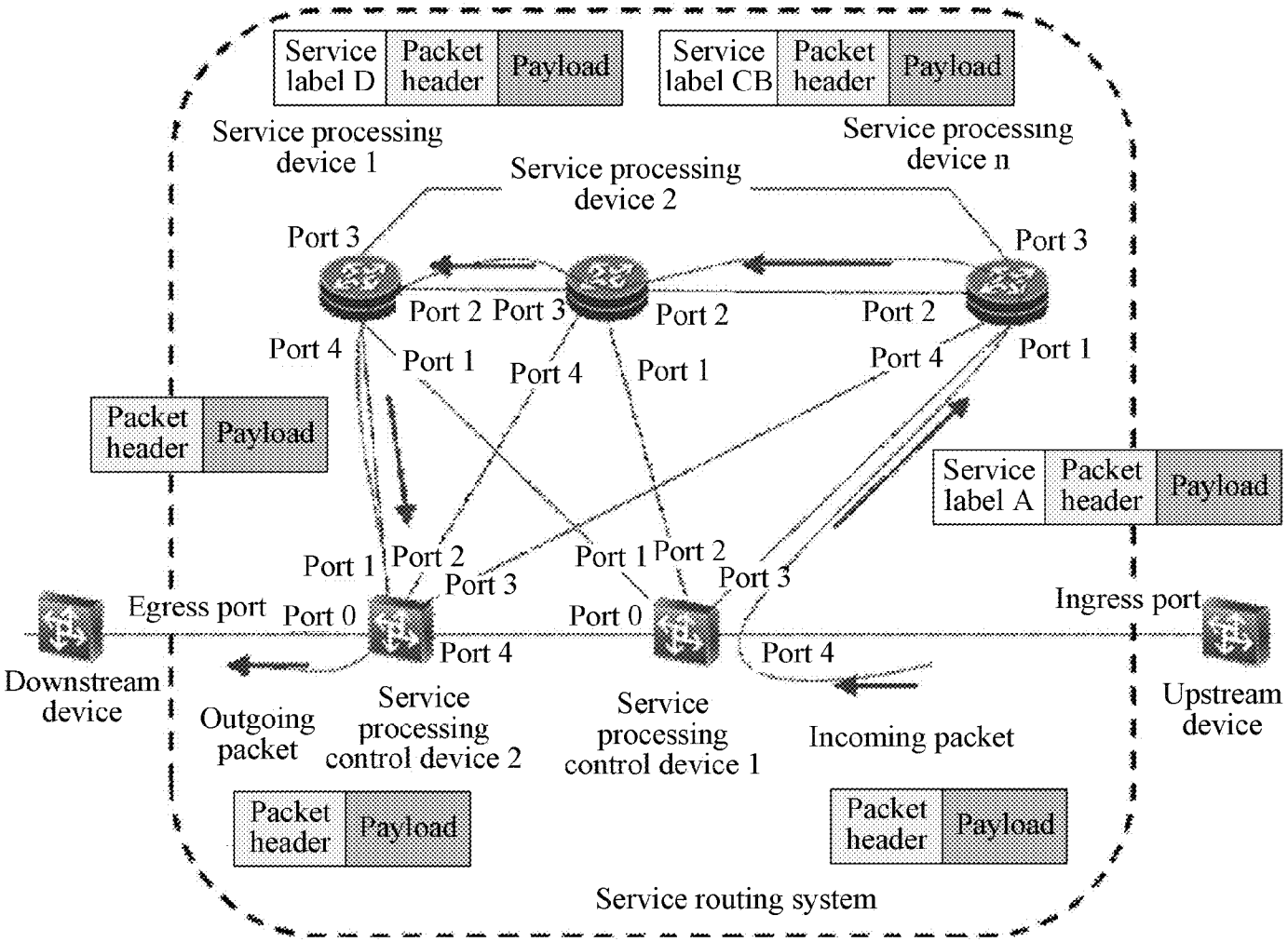
FIG. 7 is an architectural diagram of an application system of yet another embodiment of a service processing method according to the present invention.
Figure 8:
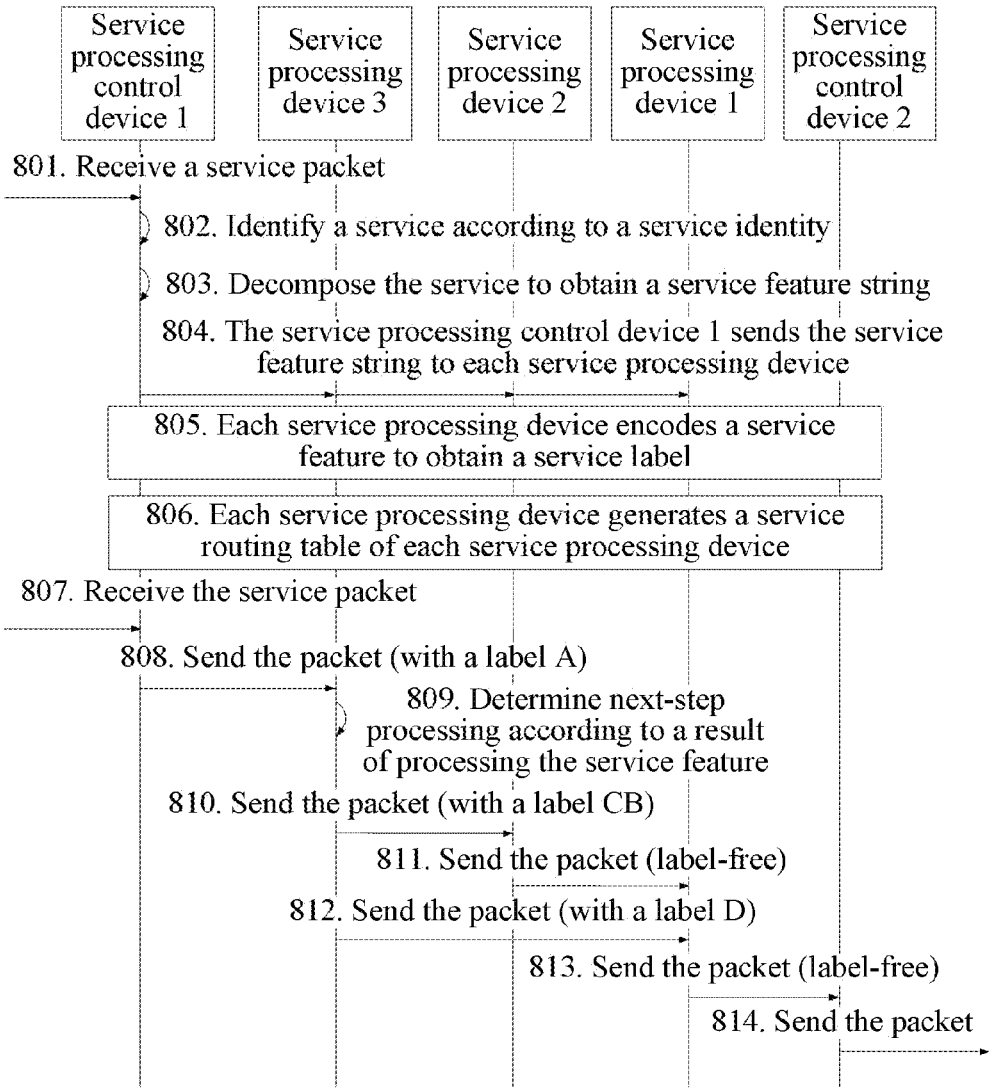
FIG. 8 is a schematic signaling diagram of yet another embodiment of a service processing method according to the present invention.

FIG. 7 is an architectural diagram of an application system of yet another embodiment of a service processing method according to the present invention, and FIG. 8 is a schematic signaling diagram of yet another embodiment of a service processing method according to the present invention. In this embodiment, a distributed routing solution is also used, and a difference from Embodiment 4 lies in: A service routing table of this embodiment is generated when a service packet is received. In addition, a service processing system in this embodiment includes a service processing device and a service processing control device, where the service processing control device is still used as egress and ingress ports of a service packet, that is, from the service processing control device, the service packet enters the service processing system and is sent out of the service processing system, and the service packet is processed by each service processing device.

As shown in FIG. 7, in this embodiment, two service processing control devices are used as examples, including a service processing control device 1 and a service processing control device 2. The two service processing control devices are separately connected to each service processing device, and the service processing devices are interconnected to each other. A service packet enters the service processing system from a port 4 of the service processing control device 1, and is sent out of the service processing system from a port 0 of the service processing control device 2. Optionally, the service processing control device 1 and the service processing control device 2 may also be combined into one service processing control device.

The service processing method of this embodiment is described as follows, where the steps described in the foregoing several embodiments are only simply introduced in this embodiment, and for details, reference may be made to Embodiment 1 to Embodiment 4. As shown in FIGS. 7 and FIG. 8, the service processing method of this embodiment includes:

801: The service processing control device 1 receives a service packet.

The service processing control device 1 may receive the service packet from an upstream device through the port 4; and the service packet generally includes a packet header and a payload, where the payload refers to a data packet on which encapsulation and transmission are performed, and the packet header bears related information of the packet, for example, a packet type and a packet version.

802: The service processing control device 1 acquires a service identity in the service packet, and obtains, according to the service identity, a service to be processed [by the service packet].

803: The service processing control device 1 decomposes a service to obtain a service feature string corresponding to the service.

For example, after the service is decomposed, the following information may be obtained: It is assumed that a service to be processed [by the service packet] includes a service feature A, a service feature B, a service feature C and a service feature D. First, the service feature A is processed, where different processing results may exist after the service feature A is processed, and it is assumed that three results, 1, 2 or 3, of processing the service feature A exist. If the result of processing the service feature A is 1, the service feature C continues to be processed, and finally the service feature B is processed; if the result of processing the service feature A is 2, the service feature D continues to be processed; and if the result of processing the service feature A is 3, the service processing ends.

804: The service processing control device 1 sends the service identity and the service feature string to each service processing device.

Referring to FIG. 7, the service processing control device 1 is connected to each service processing device, and therefore, the service processing control device 1 can send the obtained service identity and service feature string to each service processing device.

805: Each service processing device encodes a service feature to obtain a service label used to represent the service feature.

A service feature encoding rule or a service feature encoding table may be preset on each service processing device. Herein, the service feature is encoded according to the preset service feature encoding rule or the service feature encoding table, to generate a service label corresponding to the service feature.

806: Each service processing device obtains, according to the service feature string, and service features that are supported by multiple service processing devices separately, a routing path for the service features; and generates a service routing table according to the service identity, the service label, and the routing path.

A method for generating a service routing table in this embodiment is the same as that in Embodiment 4, and details are not described again. Referring to the following Table 7, Table 7 is a service routing table of the service processing control device 2 in FIG. 7, and service routing tables of the service processing device 1, the service processing device 2 and the service processing device 3 are the same as those in Embodiment 4, for which reference may be made to Embodiment 4. A service routing table of the service processing control device 1 is the same as that of the service processing device 0.

TABLE 7

Service routing table of service processing control device 2

| Ingress port | Flow label | Incoming service label | Result of processing incoming service feature | Egress port | Next-hop service label |
|---|---|---|---|---|---|
| 1 | 1 | None | No | 0 | None |

807: The service processing control device 1 receives the service packet through the port 4.

808: The service processing control device 1 acquires, according to the flow label in the service packet, a service routing table corresponding to the service packet, and sets a service label A in the service packet according to the service routing table; and sends, according to the routing path, the service packet to the service processing device 3 configured to process a service feature A.

809: The service processing device 3 processes a service feature corresponding to the service label, and determines next-step processing according to a result of processing the service feature.

For example, if the result of processing the service feature A is 1, the service processing device 3 obtains by searching the table that a corresponding egress port is 2 and a next-hop service label is CB, and 810 and 811 continue to be performed; if the result of processing the service feature A is 2, the service processing device 3 obtains by searching the table that a corresponding egress port is 3 and a next-hop service label is D, and 812 and 813 continue to be performed; and if the result of processing the service feature A is 3, the service processing device 3 obtains by searching the table that a corresponding egress port is none and a next-hop service label is none, and the service processing device 3 no longer forwards the packet, for example, may discard the service packet directly.

810: The service processing device 3 modifies the service label in the packet to CB, that is, the service processing device 3 sets, in the service packet, a service label corresponding to a service feature that is to be processed in a next step, and then forwards the packet by using a port 2 of the service processing device 3, and sends the packet to the service processing device 2.

811: The service processing device 2 receives the service packet, and first processes the service feature C and then processes the service feature B according to the service label CB in the packet; and then obtains by searching Table 5 that a corresponding egress port is 3 and a next-hop service label is none, and therefore deletes the service label and sends the packet to the service processing device 1 through a port 3, and the procedure jumps to 813.

812: The service processing device 3 modifies the service label in the packet to D, that is, the service processing device 3 sets, in the service packet, a service label corresponding to a service feature that is to be processed in a next step, and then forwards the packet by using a port 3 of the service processing device 3, and sends the packet to the service processing device 1.

813: The service processing device 1 receives the service packet, and performs next-step processing on the service packet according to the service label in the packet, where the processing is sending the packet from the port 4 to the service processing control device 2.

In this embodiment, referring to Table 6, the service label in the service packet received by the service processing device 1 (that is, an incoming service label) may have two results, which may be label-free or the service label D. No matter which service label it is, the egress port corresponding to the next-step processing is 4, and the next-hop service label is none; therefore, the service processing device 1 sends the service packet from the port 4 of the service processing device 1 to the service processing control device 2, and when the service label is D, the service label is deleted before the service packet is sent.

814: According to the service routing table shown in Table 7, the service packet received by the service processing control device 2 from the service processing device 1 has no service label, that is, a corresponding incoming service label is none; the service processing control device 2 searches the service routing table to obtain that a corresponding egress port is 0 and a next-hop service label is none, which indicates that there is no remaining service feature to be processed, so that the service processing control device 2 sends the service packet out of the service processing system from a port 0, and the processing procedure of the service packet ends.

Embodiment 6

A service processing control device provided in this embodiment can execute a service processing method according to any embodiment of the present invention. This embodiment only simply describes a structure of the service processing control device, and for a detailed structure and working principle of the service processing control device, reference may be made to any method embodiment of the present invention.

Figure 9:
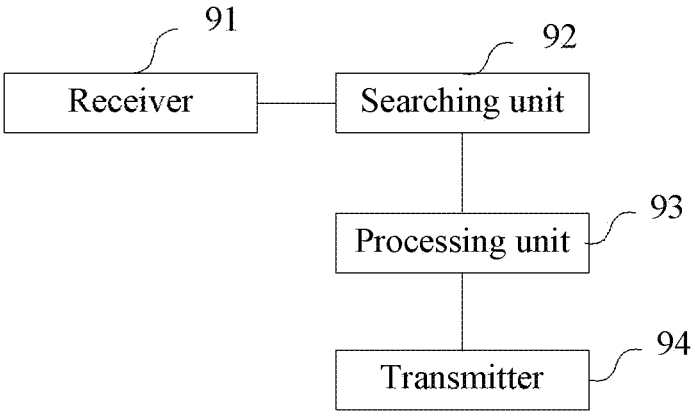
FIG. 9 is a schematic structural diagram of an embodiment of a service processing control device according to the present invention.

FIG. 9 is a schematic structural diagram of an embodiment of a service processing control device according to the present invention. As shown in FIG. 9, the service processing control device may include: a receiver 91, a searching unit 92, a processing unit 93 and a transmitter 94, where the receiver 91 is configured to receive a service packet;

the searching unit 92 is configured to search, according to a service identity in the service packet received by the receiver 91, a service routing table corresponding to the service packet, where the service identity represents a service to be processed [by the service packet]; and the service routing table includes a service label used to represent a service feature in the service, and a routing path for processing the service feature;

the processing unit 93 is configured to set the service label in the service packet according to the service routing table searched by the searching unit 92; and the transmitter 94 is configured to send, according to the routing path in the service routing table, the service packet set by the processing unit 93 to a service processing device configured to process the service feature corresponding to the service label, so that the service processing device processes the service feature corresponding to the service label.

Figure 10:
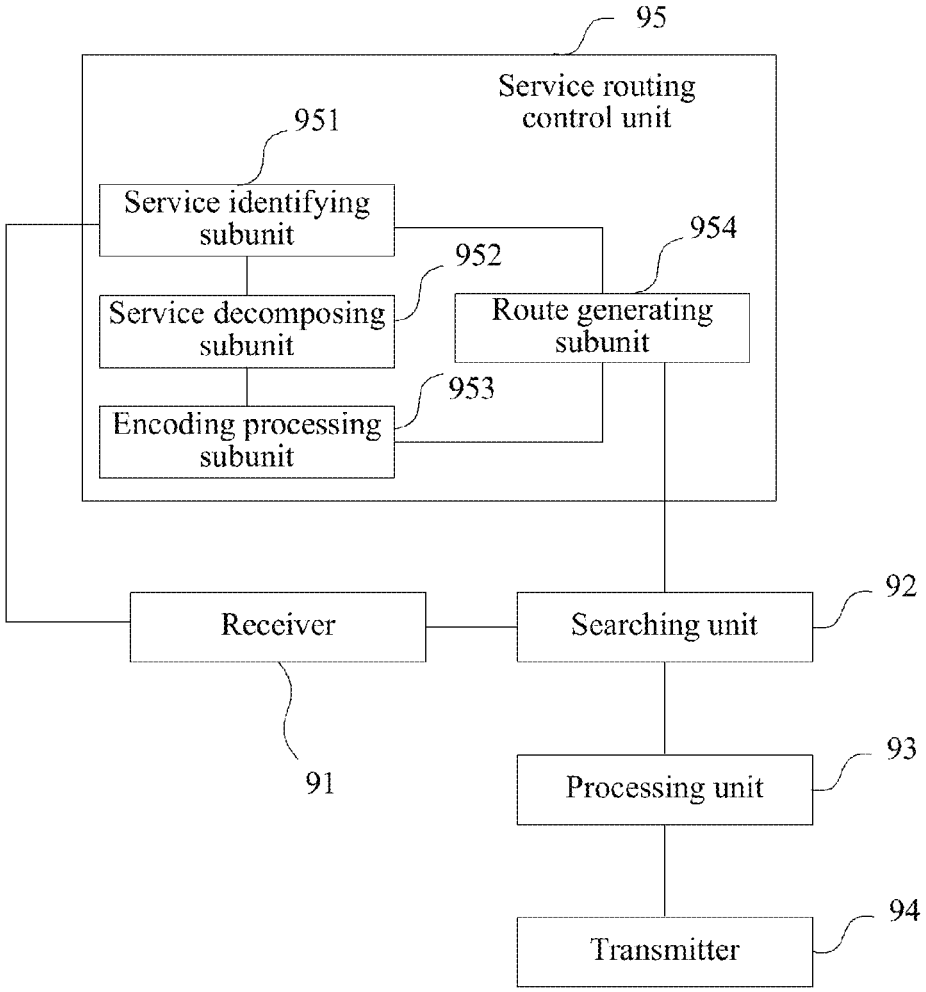
FIG. 10 is a schematic structural diagram of another embodiment of a service processing control device according to the present invention.

FIG. 10 is a schematic structural diagram of another embodiment of a service processing control device according to the present invention. As shown in FIG. 10, the service processing control device is based on the structure shown in FIG. 9, and the service processing control device may further include: a service routing control unit 95, where the service routing control unit 95 may include: a service identifying subunit 951, a service decomposing subunit 952, an encoding processing subunit 953 and a route generating subunit 954, where the service identifying subunit 951 is configured to: after the receiver 91 receives the service packet, resolve the service packet to acquire the service identity in the service packet, and obtain, according to the service identity, the service to be processed [by the service packet];

the service decomposing subunit 952 is configured to decompose the service to obtain a service feature string corresponding to the service, where the service feature string includes: each service feature in the service and a processing sequence of the service feature;

the encoding processing subunit 953 is configured to encode the service feature to obtain the service label used to represent the service feature; and the route generating subunit 954 is configured to obtain, according to the service feature string and a service feature that is supported by the service processing device, a routing path for the service feature; and generate the service routing table according to the service identity, the service label, and the routing path.

Figure 11:
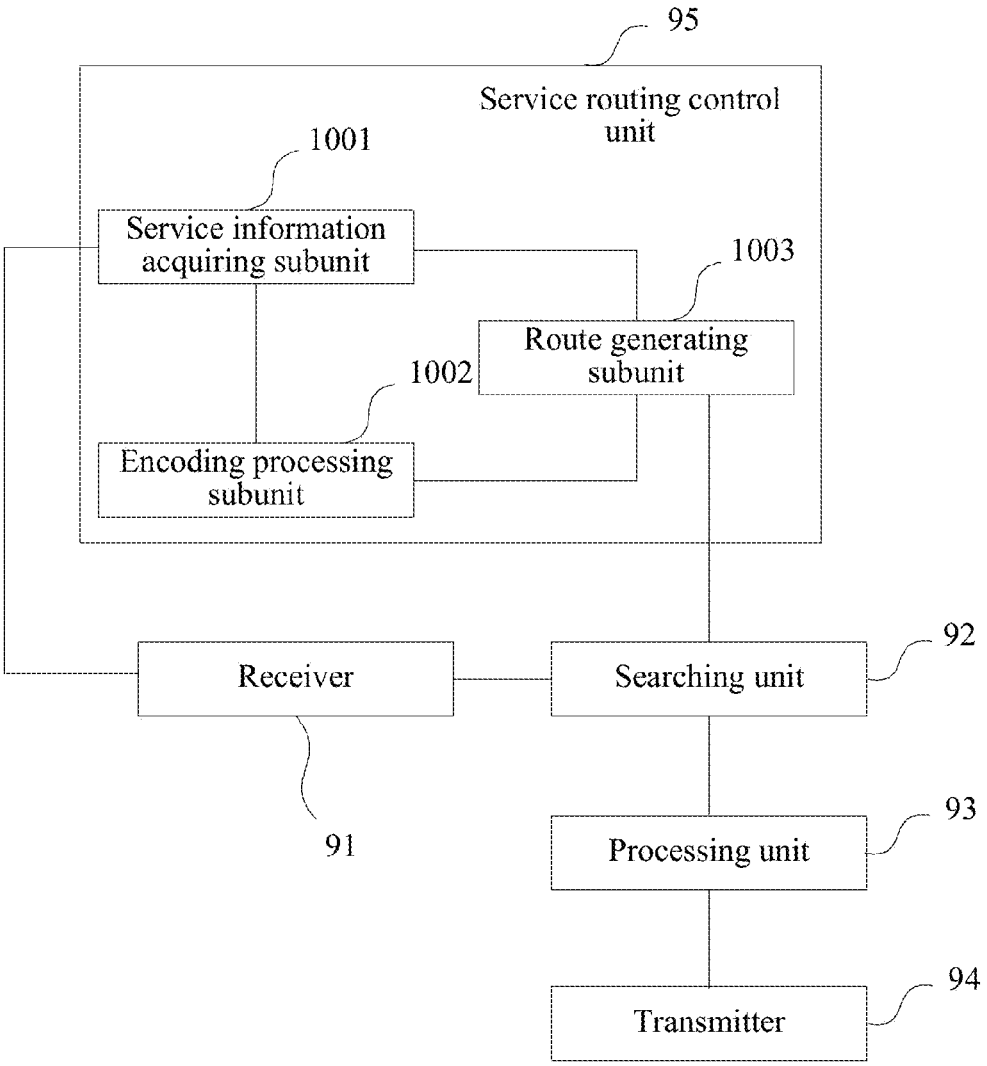
FIG. 11 is a schematic structural diagram of yet another embodiment of a service processing control device according to the present invention.

FIG. 11 is a schematic structural diagram of yet another embodiment of a service processing control device according to the present invention. As shown in FIG. 11, the service processing control device is based on the structure shown in FIG. 9, and the service processing control device may further include: a service routing control unit 95, where the service routing control unit 95 may include: a service information acquiring subunit 1001, an encoding processing subunit 1002 and a route generating subunit 1003, where a function of the encoding processing subunit 1002 is the same as that of the encoding processing subunit 953, and a function of the route generating subunit 1003 is the same as that of the route generating subunit 954; and the service information acquire subunit 1001 is configured to: before the receiver 91 receives the service packet, acquire the service identity in the service packet, and the service feature string corresponding to the service represented by the service identity.

Figure 12:
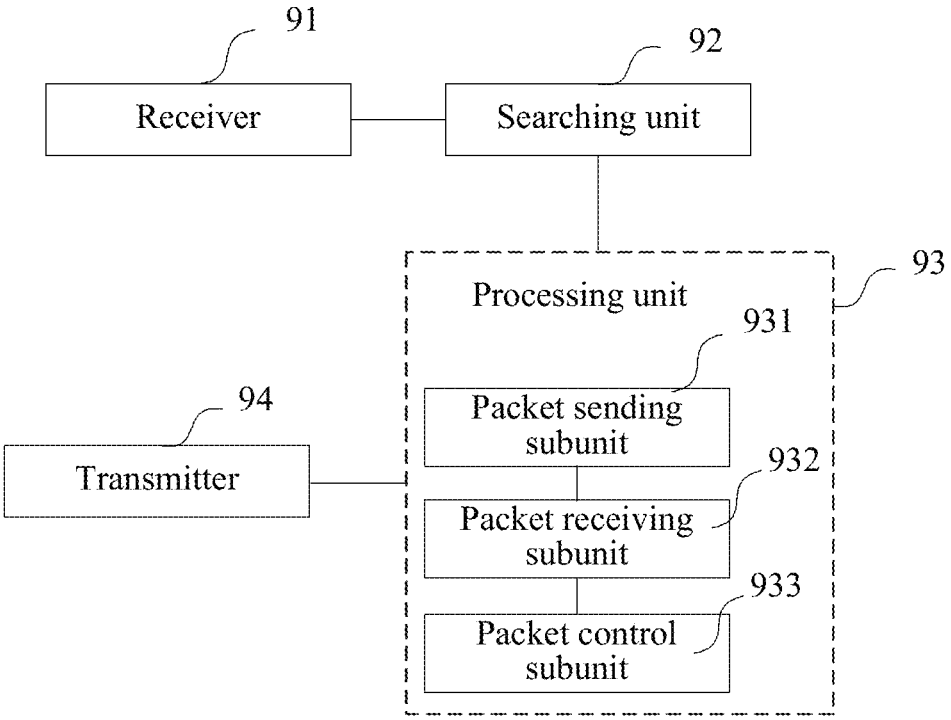
FIG. 12 is a schematic structural diagram of yet another embodiment of a service processing control device according to the present invention.

Further, FIG. 12 is a schematic structural diagram of yet another embodiment of a service processing control device according to the present invention. As shown in FIG. 12, the service processing control device is based on the structure shown in FIG. 9, and the processing unit 93 may further include: a packet sending subunit 931, a packet receiving subunit 932 and a packet control subunit 933; and the processing units 93 in FIG. 10 and FIG. 11 may also have the same structure, which is not shown in the figures, where the packet sending subunit 931 is configured to: after the service packet is received, set the service label in the service packet according to the service routing table, and send, according to the routing path, the service packet to the service processing device configured to process the service feature corresponding to the service label, so that the service processing device processes the service feature corresponding to the service label;

the packet receiving subunit 932 is configured to receive a service packet returned by the service processing device, where the service packet includes the service label modified by the service processing device according to a result of processing the service feature; and the packet control subunit 933 is configured to set, in the service packet according to the service packet returned by the service processing device and the service routing table, a service label corresponding to a next service feature to be processed, and send the service packet to a next service processing device corresponding to the service label.

Further, the packet control subunit 933 is specifically configured to search the service routing table according to the service label or a service feature processing sequence number in the service packet returned by the service processing device, and set, in the service packet, the service label corresponding to the next service feature to be processed.

Embodiment 7

A service processing device provided in this embodiment can execute a service processing method according to any embodiment of the present invention. This embodiment only simply describes a structure of the service processing device, and for a detailed structure and working principle of the service processing device, reference may be made to any method embodiment of the present invention.

Figure 13:
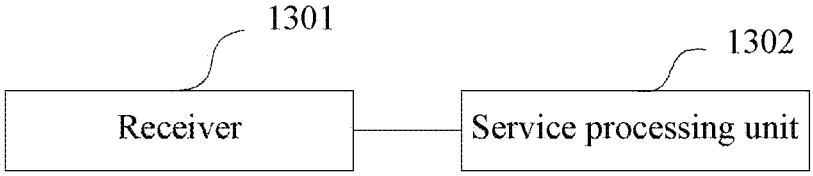
FIG. 13 is a schematic structural diagram of an embodiment of a service processing device according to the present invention.

FIG. 13 is a schematic structural diagram of an embodiment of a service processing device according to the present invention. As shown in FIG. 13, the service processing device may include: a receiver 1301 and a service processing unit 1302, where the receiver 1301 is configured to receive a service packet, where a service label is set in the service packet; and the service processing unit 1302 is configured to resolve the service label, and process a service feature corresponding to the service label.

Figure 14:
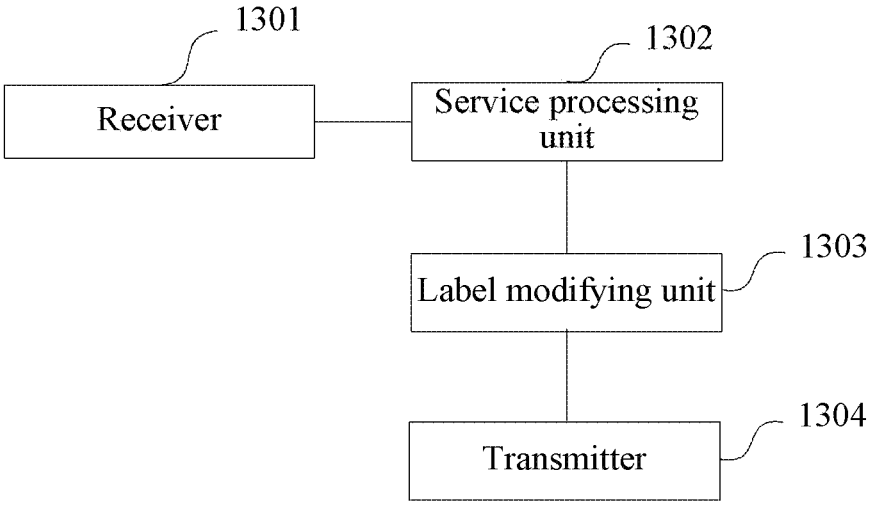
FIG. 14 is a schematic structural diagram of another embodiment of a service processing device according to the present invention.

FIG. 14 is a schematic structural diagram of another embodiment of a service processing device according to the present invention. As shown in FIG. 14, the service processing device is based on FIG. 13 and may further include: a label modifying unit 1303 and a transmitter 1304, where the label modifying unit 1303 is specifically configured to modify the service label in the service packet according to a result of processing the service feature by the service processing unit; and the transmitter 1304 is configured to send the service packet modified by the label modifying unit to a service processing control device, so that the service processing control device sends the service packet to a next service processing device.

Figure 15:
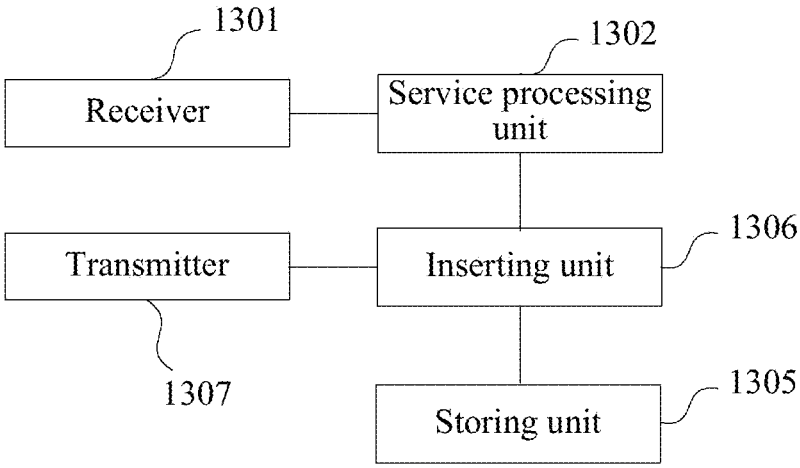
FIG. 15 is a schematic structural diagram of yet another embodiment of a service processing device according to the present invention.

FIG. 15 is a schematic structural diagram of yet another embodiment of a service processing device according to the present invention. As shown in FIG. 15, the service processing device is based on FIG. 13 and may further include: a storing unit 1305, an inserting unit 1306 and a transmitter 1307, where the storing unit 1305 is configured to store a service routing table;

the inserting unit 1306 is configured to insert a service label of a next service feature to be processed, in the service packet according to a result of processing the service feature by the service processing unit and the service routing table stored by the storing unit; and the transmitter 1307 is configured to send the service packet modified by the inserting unit to a next service processing device corresponding to the service label.

Figure 16:
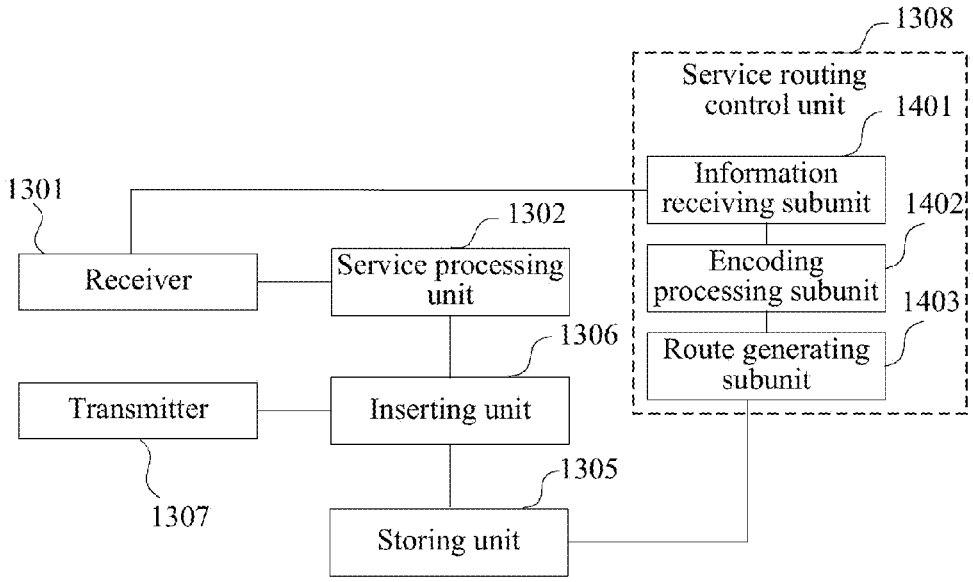
FIG. 16 is a schematic structural diagram of yet another embodiment of a service processing device according to the present invention.

FIG. 16 is a schematic structural diagram of yet another embodiment of a service processing device according to the present invention. As shown in FIG. 16, the service processing device is based on FIG. 15 and may further include: a service routing control unit 1308, where the service routing control unit 1308 includes: an information receiving subunit 1401, an encoding processing subunit 1402 and a route generating subunit 1403, where the information receiving subunit 1401 is configured to acquire a service identity in the service packet received by the receiver and a service feature string corresponding to a service represented by the service identity, where the service feature string includes: each service feature in the service and a processing sequence of the service feature;

the encoding processing subunit 1402 is configured to encode the service feature to obtain a service label used to represent the service feature; and the route generating subunit 1403 is configured to obtain, according to the service feature string and a service feature that is supported by the service processing unit, a routing path for the service feature; and generate the service routing table according to the service identity, the service label, and the routing path.

Embodiment 8

This embodiment provides a service processing system, where the system may include the service processing control device according to any embodiment of the present invention, and the service processing device according to any embodiment of the present invention. For a connection relationship between the service processing control device and the service processing device, and their respective structures and working principles, reference may be made to the method embodiments and the device embodiments of the present invention.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A service processing method, comprising:

receiving, by a service processing control device, a service packet;

searching, by the service processing control device, a service routing table corresponding to the service packet according to a service identity in the service packet, wherein the service identity represents a service to be processed [by the service packet], and the service routing table comprises *the service identity,* a service label used to represent a service feature in the service, and a routing path for processing the service feature;

setting, by the service processing control device, the service label in the service packet according to the service routing table;

sending, by the service processing control device, the service packet to a service processing device according to the routing path, wherein the service processing device is configured to process the service feature corresponding to the service label;

before the searching, by the service processing control device, the service routing table corresponding to the service packet according to the service identity in the service packet, further comprising:

after the receiving, by the service processing control device, the service packet, acquiring, by the service processing control device, the service identity in the service packet by resolving the service packet;

obtaining, by the service processing control device, the service to be processed [by the service packet] according to the service identity;

decomposing, by the service processing control device, the service to obtain a service feature string corresponding to the service, *wherein the service feature string comprises one or more service features in the service and a processing sequence of the one or more service features*;

coding, by the service processing control device, the service feature to obtain the service label used to represent the service feature;

obtaining, by the service processing control device, a routing path for the service feature according to the service feature string and [a] *the* service feature that is supported by the service processing device; and generating, by the service processing control device, the service routing table according to the service identity, the service label and the routing path.

2. The service processing method according to claim 1, wherein the setting, by the service processing control device, the service label in the service packet according to the service routing table, and sending, by the service processing control device, the service packet to a service processing device according to the routing path, comprises:

after the receiving, by the service processing control device, the service packet, setting, by the service processing control device, the service label in the service packet according to the service routing table;

sending, by the service processing control device, the service packet to the service processing device according to the routing path;

receiving, by the service processing control device, a service packet returned by the service processing device, wherein the service packet returned by the service processing device comprises the service label modified by the service processing device according to a result of processing the service feature;

setting, by the service processing control device, in the service packet returned by the service processing device according to the service packet returned by the service processing device and the service routing table, a service label corresponding to a next service feature to be processed; and sending, by the service processing control device, the service packet set the service label corresponding to the next service feature to be processed to a next service processing device, wherein the next service processing device corresponds to the service label corresponding to the next service feature to be processed.

3. The service processing method according to claim 2, wherein the setting, by the service processing control device, in the service packet returned by the service processing device according to the service packet returned by the service processing device and the service routing table, a service label corresponding to a next service feature to be processed comprises:

searching, by the service processing control device, the service routing table according to the service label or a service feature processing sequence number in the service packet returned by the service processing device, and setting, by the service processing control device, in the service packet returned by the service processing device, the service label corresponding to the next service feature to be processed.

4. A service processing method, comprising:

receiving, by a service processing control device, a service packet;

searching, by the service processing control device, a service routing table corresponding to the service packet according to a service identity in the service packet, wherein the service identity represents a service to be processed [by the service packet], and the service routing table comprises *the service identity,* a service label used to represent a service feature in the service, and a routing path for processing the service feature;

setting, by the service processing control device, the service label in the service packet according to the service routing table;

sending, by the service processing control device, the service packet to a service processing device according to the routing path, wherein the service processing device is configured to process the service feature corresponding to the service label;

before the searching, by the service processing control device the service routing table corresponding to the service packet according to the service identity in the service packet, further comprising:

after the receiving, by the service processing control device, the service packet, acquiring, by the service processing control device, the service identity in the service packet by resolving the service packet;

obtaining, by the service processing control device, the service to be processed [by the service packet] according to the service identity;

decomposing, by the service processing control device, the service to obtain a service feature string corresponding to the service, wherein the service feature string comprises[: each] *one or more* service [feature] *features* in the service and a processing sequence of the *one or more* service [feature] *features*; and sending, by the service processing control device, the service identity and the service feature string to the service processing device, so that the service processing device generates the service routing table according to the service identity and the service feature string.

5. The service processing method according to claim 4, wherein the setting, by the service processing control device, the service label in the service packet according to the service routing table, and sending, by the service processing control device, the service packet to the service processing device according to the routing path, comprises:

after the receiving, by the service processing control device, the service packet, setting, by the service processing control device, the service label in the service packet according to the service routing table; and sending, by the service processing control device, the service packet to the service processing device according to the routing path, so that the service processing device processes the service feature corresponding to the service label and sends the service packet to a next service processing device according to the service routing table.

6. A service processing control device, comprising:

a receiver, configured to receive a service packet;

a memory storing instructions;

a processor coupled to the memory *and the receiver, wherein the processor is configured* to execute the instructions to:

search, according to a service identity in the service packet received by the receiver, a service routing table corresponding to the service packet, wherein the service identity represents a service to be processed [by the service packet], and the service routing table comprises *the service identity,* a service label used to represent a service feature in the service, and a routing path for processing the service feature; and set the service label in the service packet according to the service routing table; and a transmitter *coupled to the processor*, configured to send, according to the routing path in the service routing table, the service packet set by [at least one hardware] *the* processor to a service processing device configured to process the service feature corresponding to the service label;

wherein the processor *is* further [executes] *configured to execute* the instructions to:

after the service packet is received, resolve the service packet to acquire the service identity in the service packet;

obtain, according to the service identity, the service to be processed [by the service packet];

decompose the service to obtain a service feature string corresponding to the service, wherein the service feature string comprises[: each] *one or more* service feature*s* in the service and a processing sequence of the *one or more* service [feature] *features*;

encode the service feature to obtain the service label used to represent the service feature;

obtain, according to the service feature string and [a] *the* service feature that is supported by the service processing device, a routing path for the service feature; and generate the service routing table according to the service identity, the service label and the routing path.

7. The service processing control device according to claim 6, wherein the processor [executes] *is further configured to execute* the instructions to:

after the service packet is received, set the service label in the service packet according to the service routing table;

send, according to the routing path, the service packet to the service processing device;

receive a service packet returned by the service processing device, wherein the service packet returned by the service processing device comprises the service label modified by the service processing device according to a result of processing the service feature;

set, in the service packet returned by the service processing device according to the service packet returned by the service processing device and the service routing table, a service label corresponding to a next service feature to be processed; and send the service packet set the service label corresponding to the next service feature to be processed to a next service processing device, wherein the next service processing device corresponds to the service label corresponding to the next service feature to be processed.

8. The service processing control device according to claim 7, wherein the processor [executes] *is further configured to execute* the instructions to:

search the service routing table according to the service label or a service feature processing sequence number in the service packet returned by the service processing device; and set, in the service packet returned by the service processing device, the service label corresponding to the next service feature to be processed.

9. A service processing method, comprising:

receiving, by a service processing control device, a service packet;

searching, by the service processing control device, a service routing table corresponding to the service packet according to a service identity in the service packet, wherein the service identity represents a service to be processed [by the service packet], and the service routing table comprises *the service identity,* a service label used to represent a service feature in the service, and a routing path for processing the service feature;

setting, by the service processing control device, the service label in the service packet according to the service routing table;

sending, by the service processing control device, the service packet to a service processing device according to the routing path, wherein the service processing device is configured to process the service feature corresponding to the service label;

before the searching, according to a service identity in the service packet, by the service processing control device, a service routing table corresponding to the service packet, further comprising:

before the receiving, by a service processing control device, a service packet, acquiring, by the service processing control device, the service identity [in the service packet] and a service feature string corresponding to the service represented by the service identity, wherein the service feature string comprises[: each] *one or more* service [feature] *features* in the service and a processing sequence of the *one or more* service [feature] *features*;

coding, by the service processing control device, the service feature to obtain the service label used to represent the service feature;

obtaining, by the service processing control device, a routing path for the service feature according to the service feature string and [a] *the* service feature that is supported by the service processing device; and generating, by the service processing control device, the service routing table according to the service identity, the service label and the routing path.

10. A service processing control device, comprising:

a receiver, configured to receive a service packet;

a memory storing instructions;

a processor coupled to the memory *and the receiver, wherein the processor is configured* to execute the instructions to:

search, according to a service identity in the service packet received by the receiver, a service routing table corresponding to the service packet, wherein the service identity represents a service to be processed [by the service packet], and the service routing table comprises *the service identity,* a service label used to represent a service feature in the service, and a routing path for processing the service feature; and set the service label in the service packet according to the service routing table; and a transmitter *coupled to the processor*, configured to send, according to the routing path in the service routing table, the service packet set by [at least one hardware] *the* processor to a service processing device configured to process the service feature corresponding to the service label;

wherein the processor *is* further [executes] *configured to execute* the instructions to:

before the service packet is received, acquire the service identity [in the service packet] and [the] *a* service feature string corresponding to the service represented by the service identity, *wherein the service feature string comprises one or more service features in the service and a processing sequence of the one or more service features*;

encode the service feature to obtain the service label used to represent the service feature;

obtain, according to the service feature string and [a] *the* service feature that is supported by the service processing device, a routing path for the service feature; and generate the service routing table according to the service identity, the service label and the routing path.

* * * * *